July 1, 1941.　　　A. RAMSEY　　　2,247,701
FUSE CONSTRUCTION
Filed Oct. 2, 1937　　　9 Sheets-Sheet 1
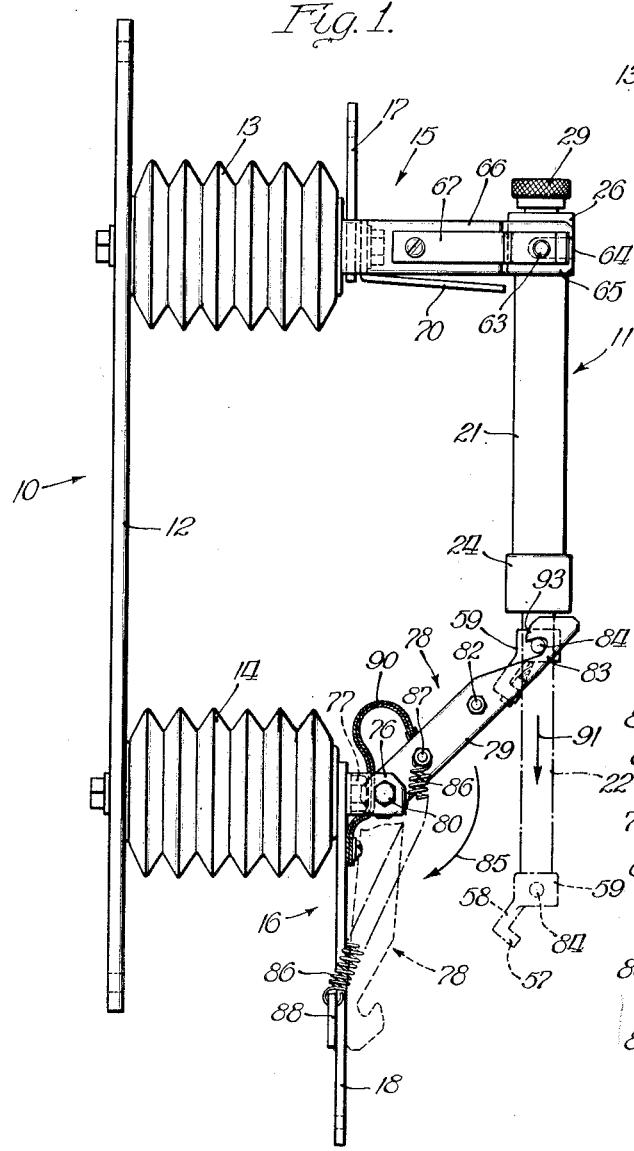
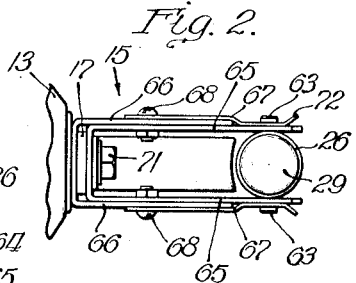
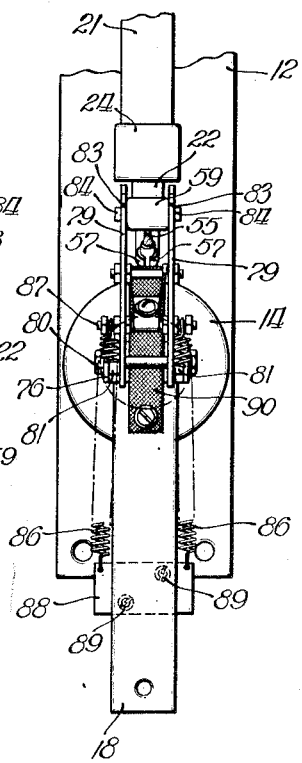
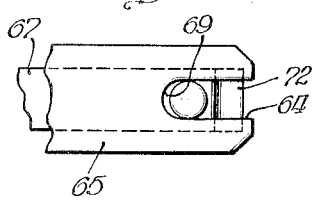
Inventor:
Allan Ramsey
By: [signature] Attys.

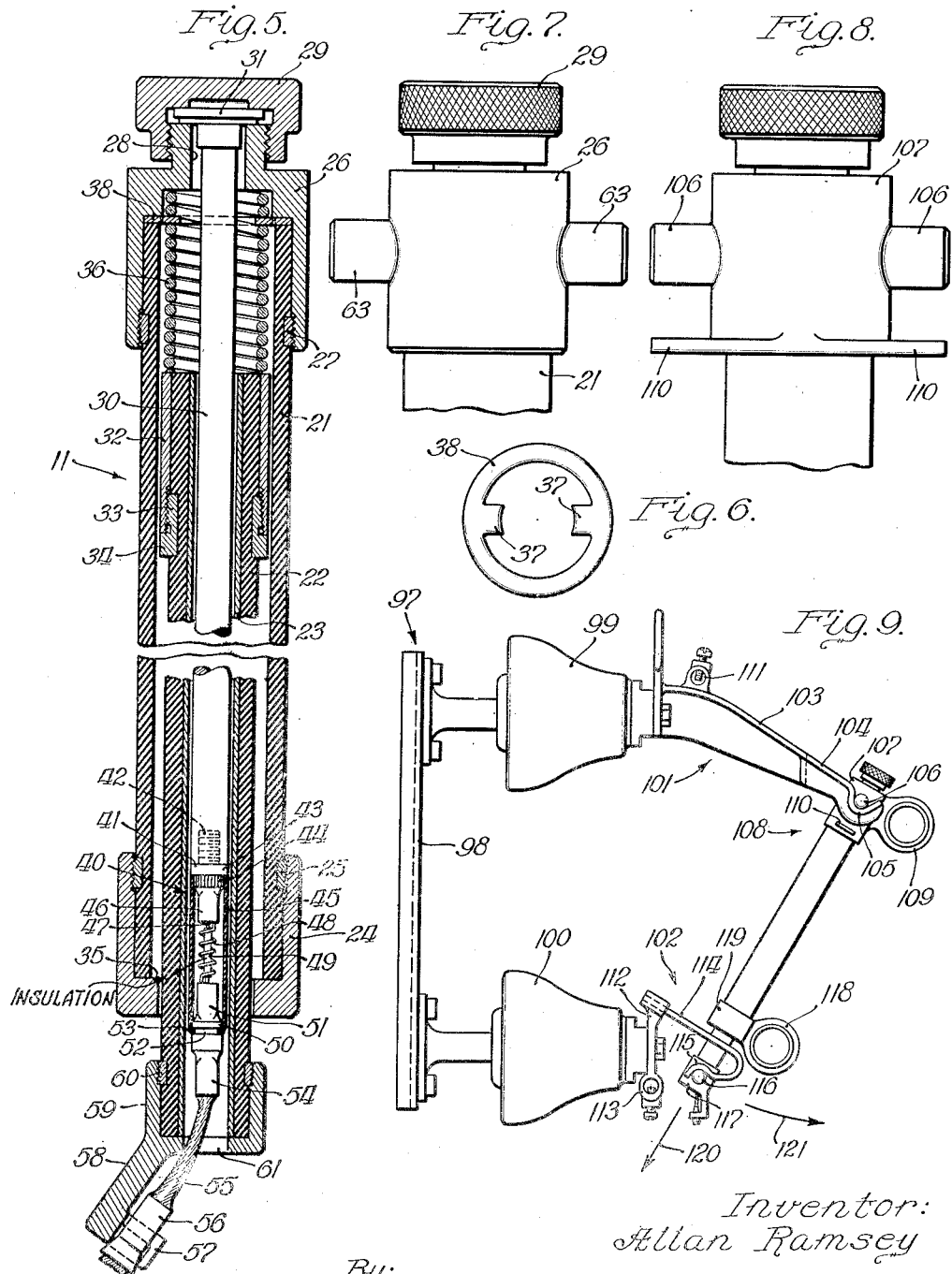

July 1, 1941.    A. RAMSEY    2,247,701
FUSE CONSTRUCTION
Filed Oct. 2, 1937    9 Sheets-Sheet 3

Inventor:
Allan Ramsey
By: Brown Jackson Boettcher Dienner
Attys.

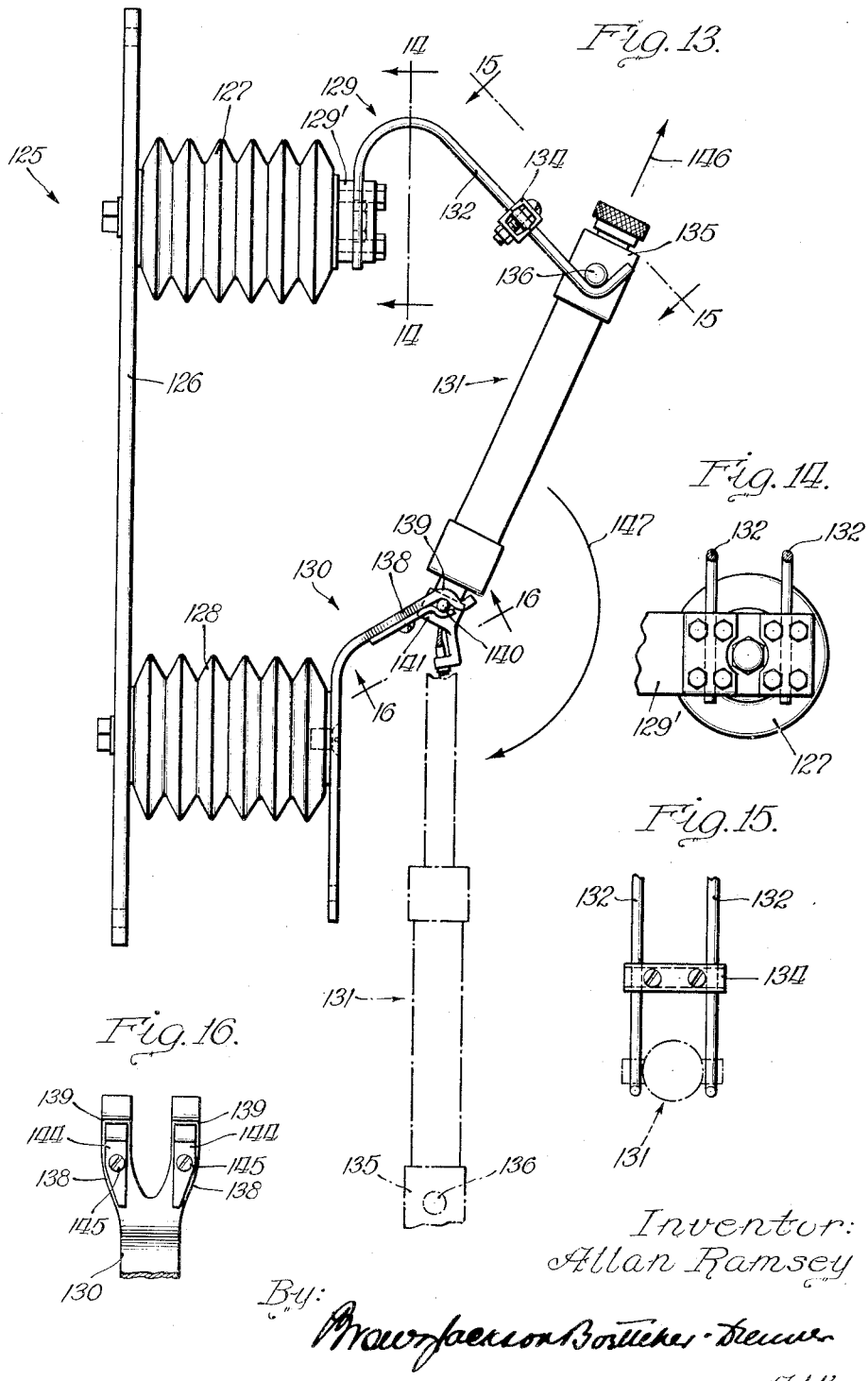

July 1, 1941.　　　A. RAMSEY　　　2,247,701
FUSE CONSTRUCTION
Filed Oct. 2, 1937　　　9 Sheets-Sheet 5
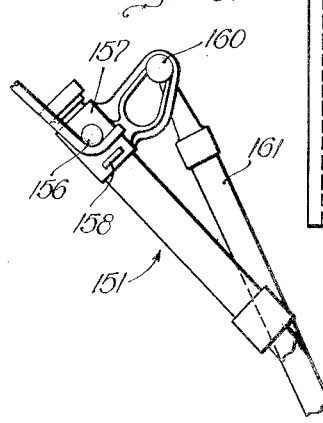
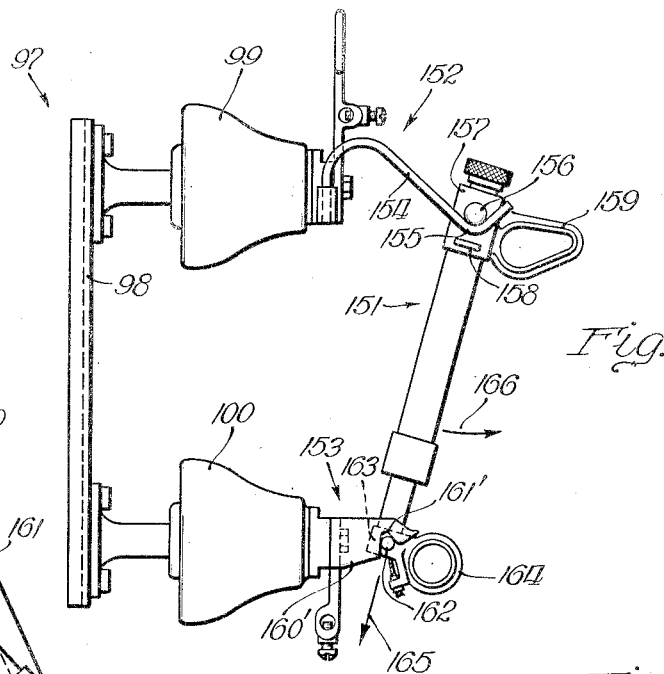
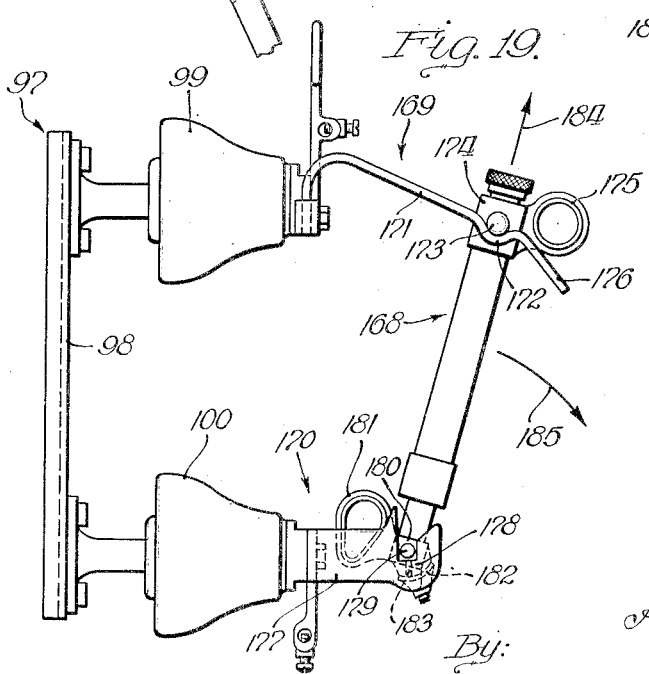
Inventor:
Allan Ramsey
By:
Attys.

July 1, 1941.    A. RAMSEY    2,247,701
FUSE CONSTRUCTION
Filed Oct. 2, 1937    9 Sheets-Sheet 6
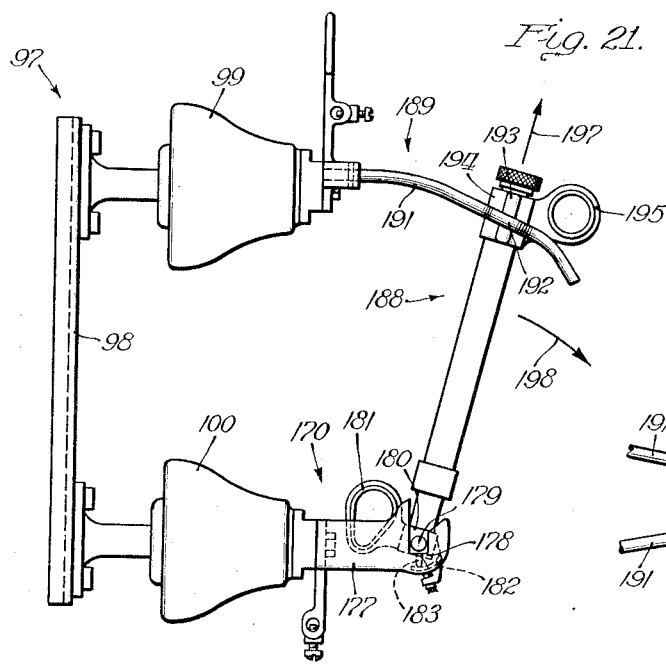
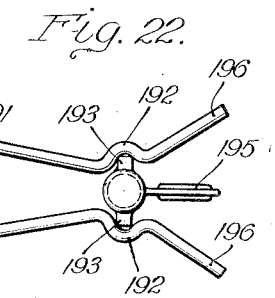
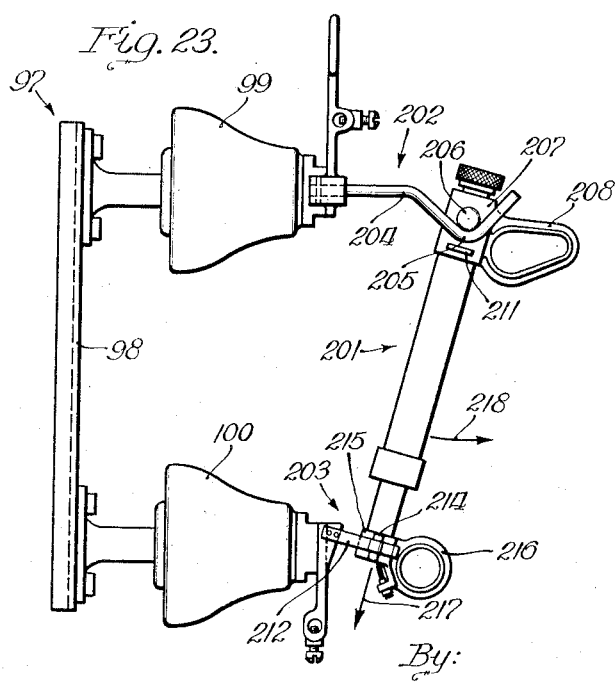
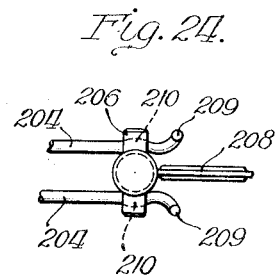
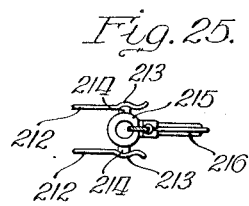
Inventor:
Allan Ramsey
By:
Attys.

July 1, 1941. A. RAMSEY 2,247,701
FUSE CONSTRUCTION
Filed Oct. 2, 1937 9 Sheets-Sheet 7

Inventor:
Allan Ramsey
By:
Attys.

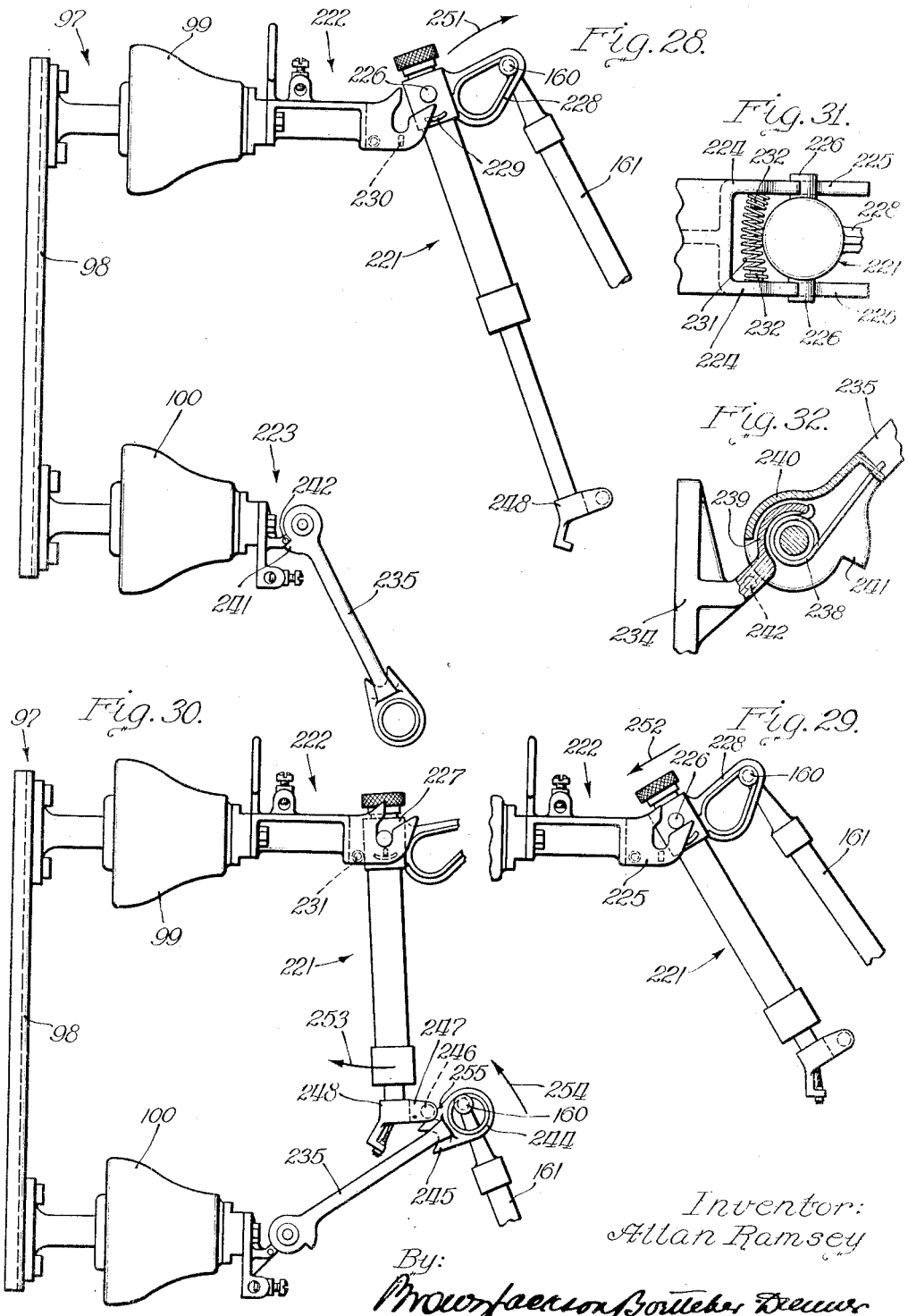

July 1, 1941.  A. RAMSEY  2,247,701

FUSE CONSTRUCTION

Filed Oct. 2, 1937  9 Sheets-Sheet 9

Inventor:
Allan Ramsey
By: Brown, Jackson, Boettcher & Dienner
Attys.

Patented July 1, 1941

2,247,701

UNITED STATES PATENT OFFICE 2,247,701

FUSE CONSTRUCTION

Allan Ramsey, Evanston, Ill., assignor to Schweitzer & Conrad, Inc., Chicago, Ill., a corporation of Delaware Application October 2, 1937, Serial No. 166,945

85 Claims. (Cl. 200—116)

My invention relates, generally to the construction of electric circuit interrupters and it has particular relation to the construction of fuse devices for this purpose.

The object of my invention, generally stated, is to provide an improved type of drop-out fuse construction that shall be simple and efficient in operation, compact in assembly, and which can be readily and economically manufactured, installed, and maintained in service.

The principal object of my invention is to provide for interrupting an electric circuit by blowing of a fusible element in a fuse housing on flow of current above a predetermined value and then automatically bodily removing a portion of the fuse housing from its operative position to provide an air gap in the circuit to completely disconnect the circuit so that there is no likelihood of a lineman or other person coming into contact with an energized conductor as might be the case if the housing remained in the circuit due to the possibility of a leakage path being present therein.

Another object of my invention is to provide for extending the length of a housing for a fusible element on blowing of the fusible element to provide for prompt interruption of the circuit in which the fusible element is connected and for an air dielectric.

It is also an object of my invention to provide a fuse construction embodying a pair of telescoping tubes so arranged that, by their telescoping action, they are capable of interrupting the circuit in which they are connected.

An important object of my invention is to provide, in a drop-out fuse construction, for completely extinguishing the arc within the fuse housing before one of its terminals is separated from the associated circuit terminal so that no arc is drawn between this one terminal of the fuse device and the associated circuit terminal on separation thereof.

Another object of my invention is to provide for interrupting an arc in a small bore of a fuse housing in which arcing terminals are biased apart by a coil spring in the housing the diameter of which is considerably greater than the diameter of the bore.

A further object of my invention is to provide for holding one end of a pair of telescoped fuse tubes in position on the circuit terminal associated therewith on blowing of a fusible element therein while permitting rotation of the fuse tubes to an inoperative position.

Still another object of my invention is to provide various forms of mounting devices for a pair of telescoped biased apart fuse tubes that are adapted to readily permit the insertion of the fused fuse tubes in operative position and the removal of the blown fuse tubes after they are called upon to interrupt fault current.

Another object of my invention is to provide for supporting a drop-out fuse device by a fuse stick in such manner that it may be readily installed thereby in a mounting therefor that is adapted to permit the fuse device to rock but not to be detached therefrom unless it is removed to a predetermined position relative thereto.

A still further object of my invention is to provide for protecting from the weather the parts of a drop-out fuse device that are likely to be damaged or rendered inoperative thereby.

Other objects of my invention will, in part, be obvious and in part appear hereinafter.

My invention, accordingly, is disclosed in the embodiments here as shown in the accompanying drawings, and it comprises the features of construction, combination of elements, and arrangement of parts which will be exemplified in the constructions hereinafter set forth, and the scope of the application of which will be indicated in the appended claims.

For a more complete understanding of the nature and scope of my invention, reference may be had to the following detailed description taken in connection with the accompanying drawings, in which:

Figure 1 is a view, in side elevation, of one embodiment of my invention;

Figure 2 is a top plan view of the upper circuit terminal shown in Figure 1;

Figure 3 is a fragmentary view, in front elevation, of the fuse device and mounting therefor as shown in Figure 1;

Figure 4 is an inside elevation view of a portion of one of the contact fingers of the upper circuit terminal shown in Figure 2;

Figure 5 is a longitudinal sectional view of the preferred form of fuse device that is employed in practicing my invention;

Figure 6 is a top plan view of a retaining washer that is employed for holding the coil compression spring in place as shown in Figure 5;

Figure 7 is a fragmentary view, in front elevation, of the upper end of the fuse device shown in Figure 5, this construction being used when the fuse device rotates about its lower end;

Figure 8 is a view similar to that shown in Figure 7, but showing the construction of the upper end of the fuse device when it is arranged to rock about this end on blowing of the fusible element;

Figure 9 is a view in side elevation of a typical form of mounting device for the fuse device shown in Figure 5;

Figure 13 is a view, in side elevation, of another embodiment of my invention in which the fuse device is arranged to rock relative to the lower circuit terminal;

Figure 14 is a detail sectional view of a portion of the upper circuit terminal taken along the line 14—14 of Figure 13;

Figure 15 is a detail view taken along the line 15—15 of Figure 13;

Figure 16 is a detail view taken along the line 16—16 of Figure 13 and showing the construction of the lower circuit terminal;

Figure 17 shows another embodiment of the mounting device for the fuse device shown in Figure 5;

Figure 18 illustrates how the fuse device for the mounting device shown in Figure 17 is carried by a fuse stick in such position that it may be readily inserted in the mounting device;

Figure 19 illustrates another form of mounting device for the fuse device shown in Figure 5;

Figure 20 illustrates how the fuse device for mounting in the mounting device shown in Figure 19 may be carried by a fuse stick;

Figure 21 illustrates another embodiment of the mounting device in which the upper terminal of the fuse device is provided with a pair of oppositely extending ribs and is arranged to rock relative to the lower circuit terminal;

Figure 22 is a detail view in top plan of the upper circuit terminal shown in Figure 21 with the fuse device mounted therein;

Figure 23 shows a mounting device, similar to that shown in Figure 21, but having the fuse device arranged to rock relative to the upper circuit terminal and the lower fuse terminal being provided with ribs;

Figure 24 is a detail top plan view of the upper circuit terminal shown in Figure 23;

Figure 25 is a detail bottom plan view of the lower circuit terminal shown in Figure 23;

Figure 28 is a view, similar to that shown in Figure 26, and illustrating how the blown fuse device is removed from the mounting device for refusing;

Figure 29 shows how the re-fused fuse device is inserted in the upper circuit terminal of the mounting device shown in Figure 26;

Figure 30 illustrates how the fuse device shown in Figure 26 is connected into the circuit by rotation of the lower contact arm into engagement therewith;

Figure 31 is a detail top plan view of the bifurcated end portion of the upper circuit terminal shown in Figure 26;

Figure 32 is a detail sectional view showing the manner in which the contact arm is mounted on the lower circuit terminal of Figure 26 and the coil spring therein is protected from the weather;

Figure 34:
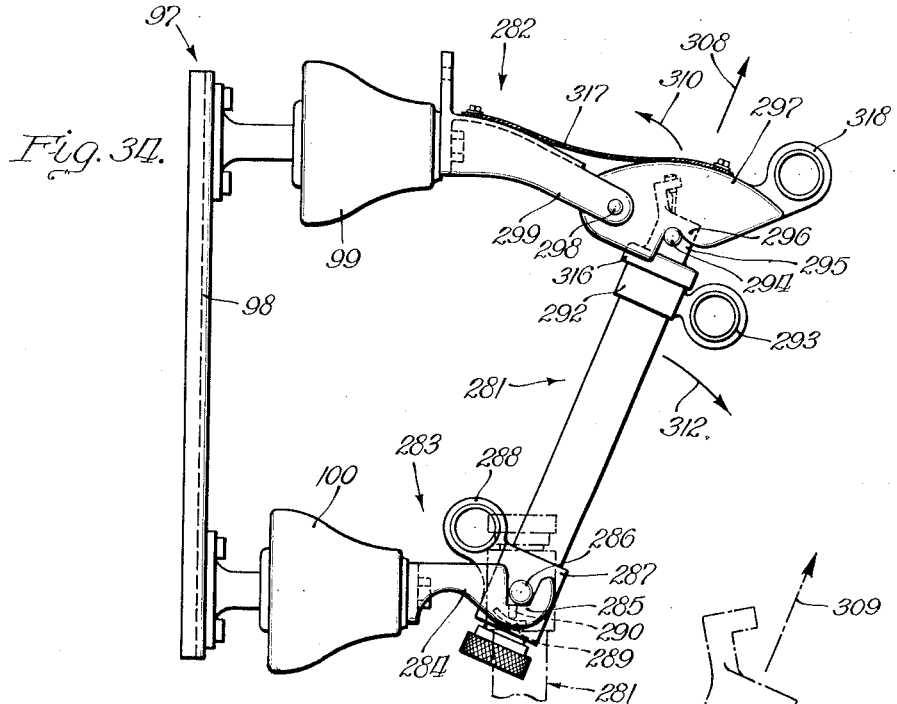
Figure 35:
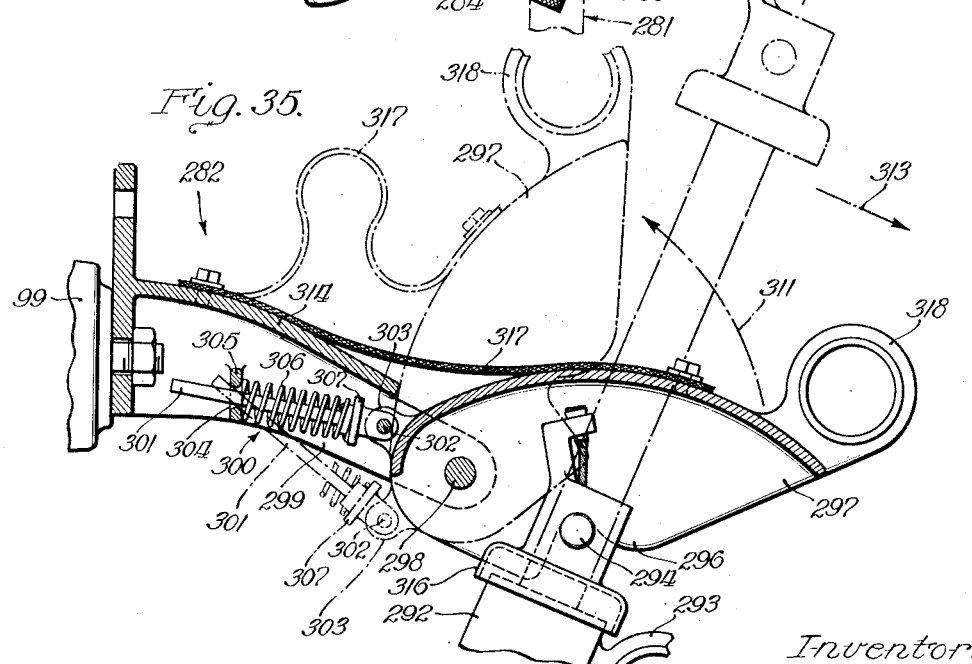

Figure 34 is a view, in side elevation, of another embodiment of the mounting device in which the fuse device is rockably mounted on the lower circuit terminal and the other end of the fuse device is latched to the upper circuit terminal by a housing that also protects it from the weather; and Figure 35 is a detail sectional view showing the construction of the upper circuit terminal of the mounting device shown in Figure 34.

Referring now to Figure 1 of the drawings, it will be observed that the reference character 10 designates, generally, a mounting device for a fuse device, shown generally at 11. The mounting device 10 comprises a suitable support member, such as the plate 12, and it has mounted at opposite ends thereof insulators 13 and 14 for supporting thereon upper and lower circuit terminals shown generally at 15 and 16 respectively. Each of these circuit terminals is provided with a circuit terminal plate 17 and 18, respectively, to which the circuit conductors may be connected, as will readily be understood.

In Figure 5 of the drawings the details of construction of the fuse device 11 are more clearly illustrated. As there shown the fuse device 11 comprises an outer fuse tube 21 with which is telescoped an inner fuse tube 22 having a liner 23. The fuse tubes 21 and 22 may be composed of suitable insulating material, such as "Bakelite," while the liner 23 may be composed of fiber which, as is now well known, evolves an arc extinguishing medium when subjected to the heat of an arc that assists in extinguishing the same. At its lower end the outer fuse tube 21 is provided with a ferrule 24 that is threaded onto an externally threaded snap ring 25 which is mounted in a suitable peripheral groove, as shown, in the outer tube 21. At its upper end the outer fuse tube 21 is provided with an upper fuse terminal 26 that is threaded onto a suitable externally threaded snap ring 27 which, like the snap ring 25, is disposed in a suitable peripheral groove in the outer fuse tube 21. The upper fuse terminal 26 is apertured as indicated at 28 and has threaded thereon a suitable cap 29. A rod-like terminal 30 extends from the upper fuse terminal 26 into the bore of the liner 23 inside of the inner fuse tube 22. A flanged head 31 is provided on the upper end of the rod-like terminal 30 and securely holds the rod-like terminal 30 in the aperture 28 when the cap 29 is screwed tightly into place.

The construction of the inner fuse tube 22 is similar to that of the outer fuse tube 21. At its upper end it is provided with a ferrule 32 that is threaded on a suitable snap ring 33 located in a peripheral groove in the inner fuse tube 22. The snap ring 33 is provided with a shoulder 34 for engaging the inwardly projecting shoulder 35 of the ferrule 24 at the lower end of the outer fuse tube 21 for limiting the outward movement of the inner fuse tube 22, as will be described hereinafter. The snap ring 33 is located in such position on the inner fuse tube 22 that, when the shoulder 34 thereof engages the inwardly projecting shoulder 35 of the ferrule 24, the lower end of the rod-like terminal 30 projects into the bore of the liner 23. In this position the upper end of this bore is substantially closed and the building up of high gas pressure in the outer fuse tube 21 is prevented.

With a view to biasing the inner fuse tube 22 outwardly with respect to the outer fuse tube 21, a coil compression spring 36 is interposed between the inner end of the fuse tube 22 and the underside of the upper fuse terminal 26 that closes the upper end of the outer fuse tube 21. It will be observed that the spring 36 bears generally against the ferrule 32 rather than against the upper end of the inner fuse tube 22 itself. This construction prevents abrasion of the upper end of the inner fuse tube 22. It is desirable that the spring 36 be held in the upper closed end of the outer fuse tube 21 when the inner fuse tube 22 moves downwardly. For this purpose the upper end turns of the spring 36 are threaded past the inwardly extending ears 37 of a washer 38, Figure 6, that is clamped between the underside of the upper fuse terminal 26 and the upper end of the outer fuse tube 21.

The fuse tubes 21 and 22 are prevented from movement apart under the influence of the coil spring 36 by a fuse link, shown generally at 40, and positioned adjacent the open lower end of the inner fuse tube 22 which, it will be understood, forms an arcing chamber lined with a material capable of evolving an arc extinguishing medium, i. e., the fiber liner 23. The fuse link 40 is of the replaceable type, and it is provided at the upper end with a fuse link terminal 41 having a stud 42 integrally formed therewith for threading into the lower end of the rod-like terminal 30. Intermediate the ends of the fuse link terminal 42 a flange 43 is provided, the diameter of which is that of the stock from which the terminal is machined and underneath it there is a knurled portion 44 for receiving a sleeve 45, preferably formed of fiber, and preventing rotation thereof relative to the link terminal. The lower end 46 of the link terminal 41 is deformed onto the upper ends of strain and fusible elements 47 and 48. The strain element 47 is preferably formed of a high strength wire, such as "Nichrome," while the fusible element 48 is preferably formed of silver. A sleeve 49 of suitable insulation may be positioned, as shown, around the strain element 47 to prevent the fusible element 48 from coming into contact engagement therewith. The fuse link 40 is provided with a lower fuse link terminal 50, the upper end 51 of which is deformed onto the lower ends of the strain and fusible elements 47 and 48. The fuse link terminal 50 is provided with a peripheral groove 52 in which is positioned a snap ring 53 for preventing the sleeve 45 from slipping out of position over the terminal 50. The lower end 54 of the fuse link terminal is deformed onto a flexible conductor 55 that is provided with a cone terminal 56 deformed thereon intermediate its ends. The lower fuse link terminal 50 will be free to move out of the lower end of the arcing chamber within the fuse tube 22 under the expulsion action of the blast of arc extinguishing medium on blowing of the strain and fusible elements 47 and 48. When this occurs the arc is drawn between the lower end of the rod-like terminal 30 and a lower fuse terminal 59, described hereinafter, that is carried by and movable with the fuse tube 22.

It will be observed that the cone terminal 56 constitutes an anchor means for the lower end of the fuse link 40 and that it is positioned between ears 57 that are integrally formed with the rearwardly extending portion 58 of a lower fuse terminal 59 threaded on a suitable split ring 60 in a peripheral groove adjacent the lower end of the inner fuse tube 22. The mechanical interconnection provided by the flexible conductor 55 between the lower link terminal 50 and the lower fuse terminal 59 insures conjoint movement of these terminals and separation of the former from the rod-like stationary terminal 30.

As illustrated, the lower fuse terminal 59 is provided with an aperture 61 which leaves the bore of the liner 23 and the inner fuse tube 22 open and through which the flexible conductor 55 extends. By leaving the lower end of the inner fuse tube 22 open, the products of the arc formed on blowing of the fuse link 40 can readily escape and dangerous pressures are not built up within the fuse device 11, as might otherwise be the case if both ends of it were closed. By the provision of the ears 57 on the rearwardly extending portion 58, it will be observed that the cone terminal 56 is positioned out of the direct path of the products of the arc that are blown out of the aperture 61 when the fuse link 40 blows. Whatever pressure from the arc blast that may be generated within the bore of the movable arcing chamber formed by the liner 23 on blowing of the strain and fusible elements 47 and 48 does not react against the movable arcing chamber since the bore is smooth and is vented at its lower end directly to the atmosphere. The relative movement of the arcing chamber and the rod-like terminal 30 is thus unaffected by the pressure incident to the blast and is solely under the control of the spring 36 modified, of course, by the force of gravity.

It will be obvious that any other suitable form of fuse link, instead of the particular form of fuse link 40 shown in the drawings, may be employed without departing from the present invention. However, it is preferable to employ a fuse link of the type such as is illustrated in order to obtain the best results.

It will now be apparent that the fuse tubes 21 and 22 and the fuse terminals 26 and 59 at their ends are restrained from movement apart under the influence of the coil spring 36 or external biasing means, as will be hereinafter described, as long as the fuse link 40 remains intact or until sufficient current flows through it to cause the fusible and strain elements 47 and 48 to be melted. This is due to the fact that the conductor, formed by the rod-like terminal 30, the fuse link 40, and the flexible conductor 55, both mechanically and electrically interconnects the fuse terminals 26 and 59. At the upper end this composite conductor is held by the flanged head 31 and at its lower end the cone terminal 56 is wedged between the ears 57. As soon as the fuse link 40 blows, i. e., when the fusible element 48 and strain element 47 melt, and this composite conductor is no longer intact, the fuse tubes 21 and 22 are no longer restrained from movement apart. Consequently, the inner fuse tube 22 moves outwardly with respect to the outer fuse tube 21 until it is stopped by engagement of the shoulder 34 with the shoulder 35.

As will hereinafter appear, either the outer fuse tube 21 or the inner fuse tube 22 may be held stationary while the other fuse tube moves on blowing of the fuse link 40. Either the upper fuse terminal 26 or the lower fuse terminal 59 may be rockably mounted to permit swinging of both of the fuse tubes 21 and 22 therewith on blowing of the fuse link 40 in order to interpose an air gap between the other fuse terminal and the circuit terminal with which it is normally associated. Suitable latching means is provided with the fuse terminal that is not rockably mounted and it is arranged to be unlatched by movement apart of the fuse tubes 21 and 22.

In order to re-fuse the fuse device 11, once it has operated, it is removed from the mounting device 10, Figure 1, or any of the mounting devices described hereinafter. The remaining portion of the flexible conductor 55 and the cone terminal 56 is removed from the ears 57. The cap 29 is then unscrewed and the rod-like terminal 30 is withdrawn. A new fuse link 40 of the desired current rating is screwed into the lower end of the rod-like terminal 30 and then the assembly is inserted through the aperture 28 in the upper fuse terminal 26 and through the bore of the fiber liner 23. The flexible conductor 55 is long enough to extend out of the lower open end of the inner fuse tube 22 when it is in the extended position. The inner fuse tube 22 is moved inwardly against the biasing force of the coil spring 36 to such position that the cone terminal 56 may be inserted between the ears 57 and then the excess portion of the conductor 55 is cut off. The cap 29 is then screwed into place and the fuse device 11 is ready for reinsertion in the mounting device, such as the device 10, Figure 1.

The telescoped construction of the fuse tubes 21 and 22 not only provides an efficient means for unlatching the fuse device 11 so that it operates as a drop-out fuse device in removing one of the fuse terminals from its associated circuit terminal, but also it provides an increased dielectric between the circuit terminals. As soon as the fuse link 40 blows and before the inner fuse tube 22 is moved relative to the outer fuse tube 21, the arcing distance between the lower end of the rod-like terminal 30 or the fuse link terminal 41 and the lower fuse terminal 59 is relatively short. Since the lower fuse terminal 59 moves relative to the rod-like terminal 30 on movement apart of the fuse tubes 21 and 22, this arcing distance is considerably increased. As a result of this construction, the likelihood of an arc persisting for an appreciable time is quite remote.

The factors involved in effecting the circuit interruption are: first, the blowing of the fuse link 40 and the resultant expulsion action in the sleeve 45 and the liner 23; next, the separation of the lower fuse terminal 59 from the lower end of the rod-like terminal 30 or the fuse link terminal 41 to assist in effecting arc extinction; and, finally, the dropping out of the fuse device 11 itself, after the arc has been completely extinguished in the bore of the liner 23 in the inner fuse tube 22, with the consequent removal of one of the fuse terminals 26 or 59 from its associated circuit terminal, for example, the removal of the lower fuse terminal 59 from the circuit terminal 16, Figure 1, in order to insure that a leakage path through the fuse tubes 21 and 22 which might be dangerous, will not be provided between the circuit terminals 15 and 16.

The movement apart of the fuse tubes 21 and 22 or the movement of the fuse device 11 to the dropped out position or both indicates that the fuse link 40 has blown. Such changes from the normal condition of the fuse device 11 are readily apparent from the ground and a lineman can quickly detect which of the fuse devices 11 it is necessary to re-fuse.

With a view to rockably mounting the fuse device 11 at its upper end, the upper fuse terminal 26 is provided with oppositely extending arms or trunnions 63, Figure 7, which may be positioned in the slotted openings 64 in the arms 65 of a U-shaped contact clip, Figure 2. The contact arms 65 are backed up by the arms 66 of a support clip. Spring fingers 67, secured to the arms 65 and 66 by suitable bolts 68, are provided with apertures at 69, Figure 4, for interfitting with the trunnions 63 and holding the same in place in the slotted openings 64. A stop-member 70, secured to the insulator 13 by a suitable bolt 71, which also secures the contact clips having the arms 65 and 66 and the circuit terminal plate 17 thereto, serves to limit the inward swinging movement of the fuse device 11. Since the outer ends 72 of the spring fingers 67 are turned outwardly, the fuse device 11 may be readily inserted into position by placing the trunnions 63 in the outer ends of the slotted openings 64 and then pushing the upper fuse terminal 26 into position. As indicated, the inward swinging of the fuse device 11 will be limited by the stop member 70. In order to remove the fuse device 11, the spring fingers 67 are spread apart sufficiently to clear the ends of the trunnions 63.

In the embodiment of the invention shown in Figure 1 of the drawings, the fuse device 11 is rockably mounted on the upper circuit terminal 15. It is then necessary to provide the latching and drop-out features at the lower end of the fuse device 11. For this purpose, the lower circuit terminal 16 has provided thereon a U-shaped clip 76, Figures 1 and 3, that is secured with the lower circuit terminal plate 18 to the insulator 14 by a suitable bolt 77. A contact arm, shown generally at 78, and comprising a pair of plate-like members 79, is rotatably mounted on a bolt 80 that extends through the upstanding arms of the clip 76. Spacers 81 serve to space the plate-like members 79 from the inner surfaces of the arms of the clip 76. A bolt 82, which extends through the plate-like members 79, serves to brace them firmly apart adjacent their outer ends. It will be observed that the outer ends of the plate-like members 79 forming the contact arm 78 are provided with hook-shaped portions 83 for engaging oppositely extending arms or trunnions 84 from the lower fuse terminal 59.

With a view to biasing the contact arm 78 about the bolt 80 in the direction indicated by the arrow 85, tension springs 86 are provided. At their upper ends the springs 86 are fastened to a bolt 87 that extends transversely through the plate-like members 79. The lower ends of the springs 86 are secured in suitable apertures in a transverse plate 88 that may be secured, as by screws, 89, to the underside of the circuit terminal plate 18. A flexible shunt 90 may be provided between the bolt 87 and the lower circuit terminal plate 18 to provide direct electrical connection between the contact arm and the plate 18.

As long as the fuse link 40 in the fuse device 11 remains intact, the relative positions of the various parts shown in Figure 1 of the drawings will be as illustrated by the full lines. It will be apparent that the fuse link 40 not only restrains the movement apart of the fuse tubes 21 and 22 as biased apart by the spring 36 but also it prevents movement of them apart as biased by the springs 86. That is, as long as the arms or trunnions 84 of the lower fuse terminal 59 are held in the position shown in Figure 1 of the drawings by the fuse link 41, the contact arm 78 is prevented from rotating in the direction indicated by the arrow 85 under the influence of the springs 86. Since sufficient biasing action can be provided by the tension springs 86 for moving the fuse tubes 21 and 22 apart, the coil compression spring 36 inside of the outer fuse tube 21 could be dispensed with. However, in order to facilitate the insertion of the re-fused fuse device 11 into the mounting device 10 by keeping the correct relation between the various parts and to assist the springs 86 in overcoming the inertia of the parts that are moved on operation of the device; it is desirable to employ the inner compression spring 36.

As soon as the fuse link 40 blows, the inner fuse tube 22 is no longer restrained and it moves downwardly in the direction indicated by the arrow 91. The contact arm 78 rotates in the direction indicated by the arrow 85. Meanwhile, the arc is being extinguished within the bore of the liner 23 in the inner fuse tube 22 during which time the hook-shaped portions 83, by virtue of their particular shape, remain in contact with the trunnions 84. At the time that they separate, the arc, in most instances, will have been extinguished with the result that no arcing takes places between the contact arm 78 and the lower fuse terminal 59. The contact arm 78 finally assumes a position indicated by the broken lines in contact with the lower circuit terminal plate 18 while the inner fuse tube 22 assumes a position also shown by broken lines. In the dropped-out position of the apparatus, it will be observed that an air gap is provided between the lower fuse terminal 59 and the lower circuit terminal 16. This insures positive interruption of the arc and at the same time, removes the fuse device 11 from direct connection between the circuit terminals 15 and 16. This is desirable since the inner surfaces of the fuse tubes 21 and 22 and the liner 23 might be rendered slightly conducting as a result of the arc being drawn therein and slight leakage currents might be permitted to flow. Also, slight leakage currents might be permitted to flow along the outer surfaces of the fuse tubes 21 and 22 as a result of their being rendered slightly conducting by having been exposed to the weather. The possibility of such leakage currents flowing is entirely obviated by providing the air gap in the circuit as described.

After the fuse device 11 has been re-fused, as described hereinbefore, it can be replaced in the mounting device 10. After the fuse device 11 has been mounted in the upper circuit terminal 15, the contact arm 78 is rotated to the position shown in the drawings. The hook-shaped end portions 83 of the plate-like members 79 are provided with inclined surfaces 93 for engaging the arms or trunnions 84 in order to facilitate movement of them into the hook-shaped portions 83, as will be readily understood.

In Figure 9 of the drawings I have illustrated a modified form of the mounting device which is shown generally at 97. The mounting device 97 comprises a channel base 98 at the ends of which are mounted suitable pin type insulators 99 and 100. Upper and lower circuit terminals, shown generally at 101 and 102, are mounted respectively on the insulators 99 and 100.

The upper circuit terminal 101 comprises an outwardly extending arm 103, the outer end 104 of which is bifurcated and is provided with hook-shaped end portions 105 that open upwardly. These hook-shaped end portions 105 are arranged to receive the trunnions 106 of an upper fuse terminal 107 that closes the upper end of the outer fuse tube of a fuse device shown generally at 108 and which is similar in construction to the fuse device 11, shown in Figure 5 of the drawings. An eye 109 is provided on the upper fuse terminal 107 and preferably integrally formed therewith for receiving the prong of a fuse stick that is ordinarily employed by a lineman or operator in removing or replacing the fuse device 108.

With a view to preventing the removal of the fuse device 108 unless it is moved to a certain predetermined position, oppositely extending flanges 110, Figure 8, are provided on the upper fuse terminal 107 and are arranged to interfit with the undersides of the hook-shaped end portions 105. When the fuse device 108 is in the position shown in Figure 9 of the drawings and the fusible element therein blows, the oppositely extending flanges 110 prevent the fuse device 108 from being lifted off of the hook-shaped end portions 105. It is only when the fuse device 108 is rotated to such position that the flanges 110 clear the undersides of the hook-shaped end portions 105 that it may be removed therefrom. The eye 109 is so positioned that, when it is supported on the prong of a fuse stick, the flanges 110 will be so positioned that the trunnions 106 may be readily dropped into the hook-shaped end portions 105.

A terminal clamp 111 is provided on the arm 103 for receiving one of the line conductors.

The lower circuit terminal 102 comprises a support plate 112 that has at its lower end a line conductor clamp 113 to which the other line conductor may be secured. A pair of relatively stiff wires 114 or support members extend outwardly from the support plate 112 and are curved inwardly at their outer ends as illustrated and are provided with downwardly opening hook-shaped portions 115 for interfitting with oppositely extending arms or trunnions 116 from a lower fuse terminal 117 on the lower open end of the inner fuse tube of the fuse device 108.

The fuse device 108 is placed in the circuit closed or operative position by engaging the prong of a switch stick in an eye 118, preferably formed integrally with a ferrule 119 on the lower end of the outer fuse tube of the fuse device 108. By swinging the fuse device 108 inwardly in this manner, the arms or trunnions 116 engage the inwardly curved outer ends of the wires or support members 114 and finally are seated in the downwardly opening curved portions 115. The wires 114 are sufficiently resilient to permit placing the fuse device 108 in the operative position and to provide the necessary contact pressure with the arms or trunnions 116 at the same time to bias the two telescoping fuse tubes forming the fuse device 108 apart.

As soon as the fuse link inside of the fuse device 108 blows, the lower fuse terminal 117 is no longer restrained and the arms or trunnions 116 move in the direction indicated by the arrow 120 and out of engagement with the downwardly opening hook-shaped portions 115. This movement takes place as a result of the biasing action of the wires or support members 114 and the coil compression spring inside the fuse device 108 that corresponds to the spring 36, shown in Figure 5 of the drawings. After the arms or trunnions 116 have cleared the downwardly opening hook-shaped portions 115, the fuse device 108 rocks about the trunnions 106 in the direction indicated by the arrow 121. It will finally occupy a position such that the longitudinal axis of the fuse device 108 is substantially vertical. In this position the lower fuse terminal 117 is spaced from the lower circuit terminal 102, thereby providing the desired air gap in the circuit.

Figure 10:
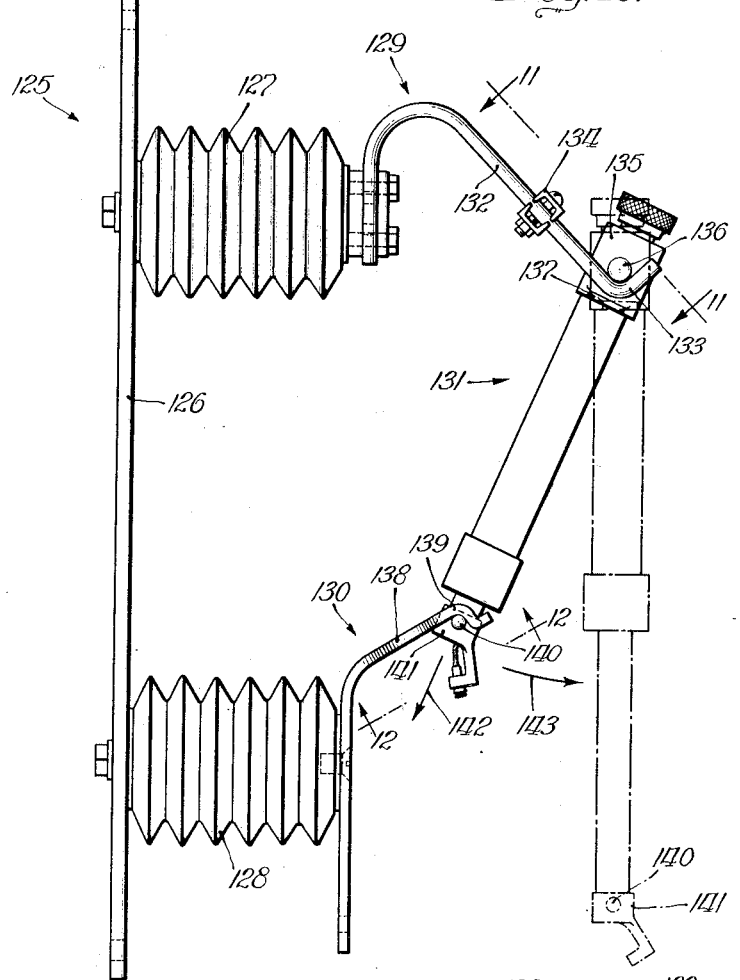
Figure 10 is a view, in side elevation, of another embodiment of the invention in which the fuse device is arranged to rock on the upper terminal when the fusible element therein blows.

In Figure 10 of the drawings another embodiment of the mounting device is shown generally at 125. This device includes a plate 126 at the ends of which are mounted insulators 127 and 128. Upper and lower circuit terminals 129 and 130 are carried by these insulators, as shown. A fuse device, shown generally at 131, and comprising a pair of telescoped fuse tubes as shown in Figure 5 of the drawings is arranged for mounting on the circuit terminals 129 and 130.

Figure 11:
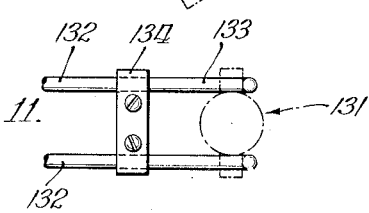
Figure 11 is a detail view taken along the line 11—11 of Figure 10.

The upper circuit terminal 129 comprises a pair of relatively stiff wires 132 that are arranged to be mounted at one end, as illustrated, on the insulator 127 and are upwardly curved at their other ends as shown at 133. A suitable clamp 134, Figure 11, serves to maintain the relatively stiff wires 132 in the proper spaced relation. The fuse device 131 is provided with an upper fuse terminal 135 that has arms or trunnions 136 projecting therefrom for rockably mounting in the upwardly curved end portions 133 of the wires 132. Flanges 137, similar to the flanges 110, Figure 8, are provided on opposite sides of the fuse terminal 135 to prevent the movement of the fuse device 131 out of the upper circuit terminal 129 unless it is moved to such position that the flanges 137 clear the outer ends thereof. The wires 132 forming the upper circuit terminal 129 are relatively stiff, as indicated, in order that they will be able to resist the upward thrust of the fuse device 131 when the fuse link therein blows, the thrust being applied thereto by the flanges 137, as will be readily understood.

Figure 12:
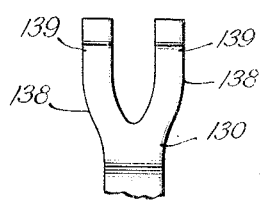
Figure 12 is a detail view taken along the line 12—12 of Figure 10 and showing the construction of the lower circuit terminal.

The lower circuit terminal 130 comprises a suitably formed strap member, the upper end of which is curved outwardly as illustrated and bifurcated as indicated at 138, Figure 12. The extreme outer ends are curved downwardly as indicated at 139 for receiving therein the arms or trunnions 140 of the lower fuse terminal 131 that is secured onto the lower end of the inner fuse tube of the fuse device 131. The strap forming the lower circuit terminal 130 is sufficiently resilient to permit the placing of the arms or trunnions 140 in position in the downwardly curved hook-shaped end portions 139.

When the fuse link in the fuse device 131 blows, the inner fuse tube and the lower fuse terminal 141 move downwardly in the direction indicated by the arrow 142 until the arms or trunnions 140 clear the outer downwardly extending end portions 139. The fuse device 131 then rocks about the trunnions 136 in the direction indicated by the arrow 143 to its position as shown by the broken lines. It will be observed that, in this position, the fuse tubes are extended and that the lower fuse terminal 141 is spaced from the lower circuit terminal 130 to provide the desired air gap therebetween.

In Figure 13 of the drawings a mounting device 125 is shown that is similar to the mounting device 125 shown in Figure 10 of the drawings. However, the mounting device 125 shown in Figure 13 is arranged to rockably mount a fuse device 131 about the lower circuit terminal 130 rather than about the upper circuit terminal 129. The wires 132 forming a part of the upper circuit terminal 129 are somewhat lighter than the corresponding wires shown in Figure 10. This construction is desired in order to assist in the movement apart of the fuse tubes forming the fuse device 131 when the fuse link therein blows. The flanges 137, Figure 10, are omitted from the upper fuse terminal 135 shown in Figure 13 for a reason that will presently be apparent.

Circuit connection to the upper circuit terminal 129 is provided by a circuit terminal plate 129', Figure 14, which is clamped with the wires 132 by any suitable means to the insulator 127.

Since the fuse device 131 rocks about the lower circuit terminal 130, clips 144, Figure 16, are provided on the outwardly curved end of the strap mounting it and are secured thereto by suitable screws 145 to hold the arms or trunnions 140 in place.

When the fuse link in the fuse device 131 blows, the upper fuse terminal 135 and outer fuse tube move in the direction indicated by the arrow 146. Since no flanges are provided on the upper fuse terminal 135, this movement is permitted. This movement takes place as a result of the biasing action of the internal coil spring in the fuse device 131, for example, the spring 36, Figure 5, assisted by the biasing force of the wires 132 forming the upper circuit terminal 129 and further assisted by the expulsion action of the fuse link in blowing. As soon as the arms or trunnions 136 have cleared the outer ends of the wires 132, the fuse device 131 is free to rock in the direction indicated by the arrow 147 about the lower circuit terminal 130 to the position shown by the broken lines. In this position the upper fuse terminal 135 is spaced a relatively great distance from the upper circuit terminal 129, thereby providing the desired air gap in the circuit.

In Figure 17 of the drawings I have shown means for mounting a fuse device 151, constructed as shown in Figure 5 of the drawings, that is generally similar to the mounting device 97 shown in Figure 9. Upper and lower circuit terminals 152 and 153 are provided on the insulators 99 and 100 respectively.

In this embodiment of the invention the fuse device 151 is arranged to rock relative to the upper circuit terminal 152 when the fuse link blows.

The upper circuit terminal 152 comprises a pair of relatively light wires 154, the outer ends of which are curved upwardly as indicated at 155 for receiving oppositely projecting arms or trunnions 156 of an upper fuse terminal 157 on the outer fuse tube forming the fuse device 151. Oppositely extending flanges 158 are provided on the upper fuse terminal 157 to prevent the fuse device 151 from being lifted out of the upper circuit terminal 152 when the fuse link blows.

With a view to facilitating the placing of the fuse device 151 in the upper circuit terminal 152, the upper fuse terminal 157 is provided with an integrally formed elongated eye 159 for receiving at its outer end a prong 160, Figure 18, of a fuse stick 161. It will be observed that, when the fuse device 151 is carried in the manner there shown, it may be readily dropped into position on the upper circuit terminal 152 with the outer ends of the wires 154 extending upwardly between the arms or trunnions 156 and the flanges 158.

The lower end of the fuse device 151 is latched to the lower circuit terminal 153. For this purpose this circuit terminal is provided with a pair of spaced apart outwardly extending arms 160' having adjacent their outer ends downwardly opening hooked portions 161'. These hooked portions 161' are adapted to receive therein oppositely extending arms or trunnions 162 from a lower fuse terminal 163 at the lower end of the inner fuse tube forming a part of the fuse device 151. An eye 164, preferably integrally formed with the lower fuse terminal 163, is provided for receiving the prong 160 of the fuse stick 161 to move the trunnions 162 into the hook-shaped portions 161'.

When the fuse link in the fuse device 151 blows, the fuse tubes forming the same are moved apart and the lower fuse terminal 163 moves downwardly in the direction indicated by the arrow 165. As soon as the trunnions 162 clear the outer ends of the arms 160' the fuse device 151 is free to rotate in the direction indicated by the arrow 166. An air gap is then provided between the lower fuse terminal 163 and the lower circuit terminal 153.

In Figure 19 I have illustrated a mounting device, similar to that shown in Figure 9, for rockably mounting a fuse device 168 at its lower end and latching the same at the upper end. Upper and lower circuit terminals 169 and 170 are mounted on the insulators 99 and 100. As illustrated, the fuse device 168 is mounted therebetween.

The upper circuit terminal 169 comprises a pair of spring wires 171 having upwardly curved hook-shaped portions 172 for receiving therein arms or trunnions 173 of an upper fuse terminal 174 of the fuse device 168. An eye 175, preferably integrally formed with the upper fuse terminal 174, is provided for receiving the prong 160 of a fuse stick 161 for placing the fuse device 168 in operative position. The outer ends 176 of the spring wires 171 slope downwardly to provide an inclined surface for receiving the trunnions 173 and permitting movement thereof into the upwardly opening hook-shaped portions 172.

The lower circuit terminal 170 comprises a pair of spaced apart relatively rigid arms 177 having upwardly opening hook-shaped portions 178 at their outer ends for receiving therein arms or trunnions 179 that extend from opposite sides of a lower fuse terminal 180 carried by the inner fuse tube of the fuse device 168. An eye 181, preferably integrally formed with the lower fuse terminal 180, is provided for receiving the prong 160, Figure 20, of the fuse stick 161. As shown in this figure, the prong 160 is inserted in the eye 181 for positioning the trunnions 179 in the upwardly opening hook-shaped portions 178. After the fuse device 168 has been placed on the lower circuit terminal 170, the prong 160 is inserted in the eye 175 and the fuse device 168 is rotated to the position shown in Figure 19.

In order to prevent the fuse device 168 from being blown out of the lower circuit terminal 170 when the fuse link blows, the lower fuse terminal 180 is provided on opposite sides with curved flanges 182 that are arranged to interfit with inwardly extending ribs 183 from the inner surfaces of the arms 177.

On blowing of the fuse link in the fuse device 168, the upper fuse terminal 174 and the outer fuse tube move upwardly as indicated by the arrow 184 until the trunnions 173 have cleared the outer ends of the spring wires 171. The fuse tubes forming the fuse device 168 then rotate as indicated by the arrow 185 with the lower fuse terminal 180 to the dropped-out position. In this position it will be understood that the desired air gap is provided between the upper fuse terminal 174 and the upper circuit terminal 169. As a matter of fact, in the dropped-out position, since the upper fuse terminal 174 is below the lower fuse terminal 180, the air gap in the circuit is that represented by the distance between the circuit terminals 169 and 170.

In Figure 21 of the drawings a mounting device is illustrated for suitably mounting the fuse device shown generally at 188. The details of construction of the fuse device 188 are similar to those shown in Figure 5 of the drawings. It is arranged to be mounted between an upper circuit terminal 189 on an insulator 99 and a lower circuit terminal 170 that is similar in construction to the lower circuit terminal 170 shown in Figure 19 of the drawings. In this embodiment of the invention a fuse device 188 is arranged to rock relative to the lower circuit terminal 170 and to be unlatched from the upper circuit terminal 189.

It will be observed that the upper terminal 189 comprises a pair of relatively rigid wires 191, the outer end portions of which are provided with inwardly opening hook-shaped portions 192 for receiving therebetween longitudinally extending ribs 193 from an upper fuse terminal 194 of the outer fuse tube of the fuse device 188. An eye 195, preferably integrally formed with the upper fuse terminal 194, is provided to permit insertion of the prong of a fuse stick for placing the fuse device 188 in operative position. The outer ends of the wires 191 are turned outwardly as indicated at 196 in order to provide for receiving the ribs 193 and guiding them into the inwardly opening hook-shaped portions 192.

Since the details of construction of the lower circuit terminal 170 and the manner in which the fuse device 188 is mounted therein are similar to those shown in Figure 19 and described hereinbefore, a detailed description thereof will not be set forth.

When the fuse link in the fuse device 188 blows, the upper fuse terminal 194 and the outer fuse tube on which it is mounted move in the direction indicated by the arrow 197 until the ribs 193 have cleared the inwardly opening hook-shaped portions 192. The fuse device 188 is then free to rotate about the trunnions 179 on the lower circuit terminal 170 in the direction indicated by the arrow 198.

In Figure 23 of the drawings a mounting device is illustrated for rockably mounting a fuse device, shown generally at 201, on an upper circuit terminal 202 that is carried by the insulator 99. The fuse device 201 is latched at its lower end to a lower circuit terminal 203 that is carried by the insulator 100.

The upper circuit terminal 202 includes a pair of relatively rigid wires 204 that are provided with upwardly opening hook-shaped portions 205 adjacent their outer ends for receiving arms or trunnions 206 of an upper fuse terminal 207 that is mounted on the upper end of the outer fuse tube which forms a part of the fuse device 201. It will be understood that the fuse device 201 is similar in internal construction to the fuse device 11 shown in Figure 5. An eye 208 is preferably integrally formed with the upper fuse terminal 207 for receiving the prong of a fuse stick to permit placing the fuse device 201 in operative position. As shown in Figure 24 the outer end portions 209 of the wires 204 are flared outwardly and the portions 210 are curved outwardly for guiding and gripping respectively the upper fuse terminal 207 as it is placed in operative position. This gripping action of the portions 210 that is provided by the spreading apart slightly of the wires 204 when the upper fuse terminal 207 is placed therebetween provides the required contact pressure therewith. Flanges 211 extending from the opposite sides of the upper fuse terminal 207 serve to prevent disengagement thereof from the upper circuit terminal 202 when the fuse device operates.

With a view to latching the lower end of the fuse device 201 to the lower circuit terminal 203, the latter is provided with a pair of spaced apart spring fingers 212, the outer ends of which are provided with inwardly opening hook-shaped portions 213 for receiving therebetween ribs 214 formed integrally with a lower fuse terminal 215 carried at the lower end of the inner fuse tube forming a part of the fuse device 201. An eye 216, forming a part of the lower fuse terminal 215, is provided for receiving the prong of a fuse stick.

When the fuse link in the fuse device 201 blows, the lower fuse terminal 215 and inner fuse tube move in the direction indicated by the arrow 217. As soon as the ribs 214 have cleared the spring fingers 212, the fuse device 201 is free to swing in the direction indicated by the arrow 218. This movement places an air gap between the lower circuit terminal 203 and the lower fuse terminal 215.

When it is desired to insert a re-fused fuse device 201 in the mounting device, the eye 208 is positioned on the prong of a fuse stick where it will occupy substantially the relation thereto as shown in Figure 18 of the drawings. The trunnions 206 can then be positioned in the upwardly opening hook-shaped end portions 205 of the wires 204 without difficulty. The prong of the fuse stick is then inserted in the eye 216 and the lower fuse terminal 215 is moved into the circuit closing position as shown in Figures 23 and 25.

Figures 26, 27:
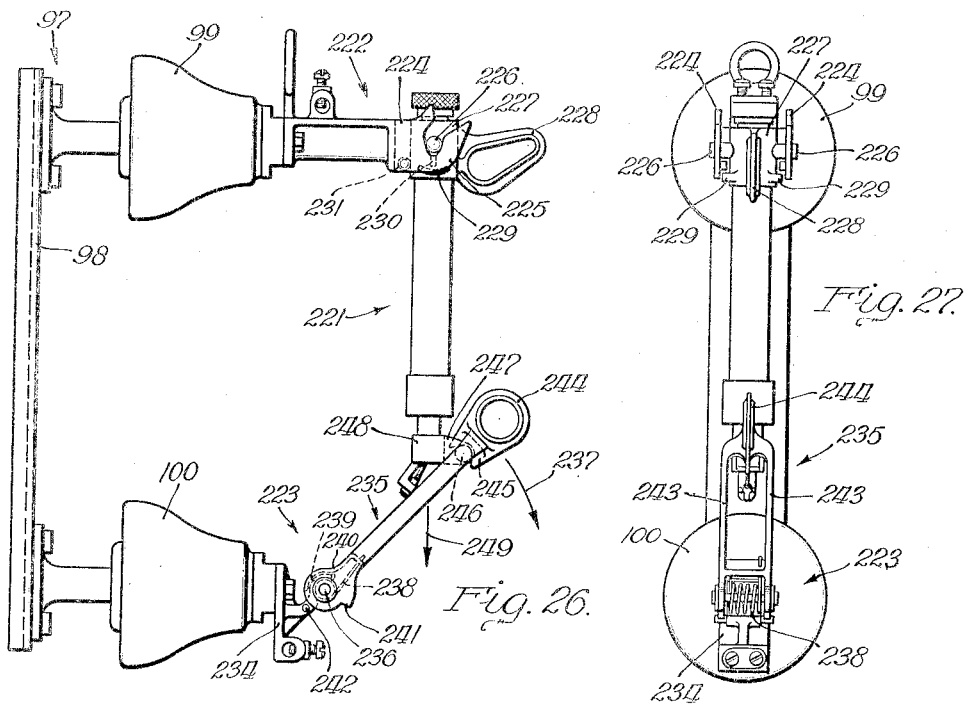
Figure 26 is a view, in side elevation, of a mounting device for the fuse device shown in Figure 5 in which a contact arm is rotatably mounted on the lower circuit terminal.
Figure 27 is a view, in front elevation, of the mounting device shown in Figure 26.

In Figure 26 of the drawings I have illustrated the manner in which a fuse device, shown generally at 221, may be rockably mounted on an upper circuit terminal 222, carried by the insulator 99, and latched to a lower circuit terminal 223 carried by the insulator 100.

The upper circuit terminal 222 at its outer end 224 is bifurcated and is provided with upwardly opening hook-shaped portions 225 for receiving therein the arms or trunnions 226 of an upper fuse terminal 227 that is carried by the outer fuse tube of the fuse device 221. It will be understood that the internal details of construction of the fuse device 221 are similar to those of the fuse device 11 shown in Figure 5. An eye 228 formed with the upper fuse terminal 227 provides for mounting the fuse device 221 on the prong of a fuse stick for placing the same in the upper circuit terminal 222. Flanges 229 on opposite sides of the fuse terminal 227 are arranged to interfit with inwardly projecting lugs 230 on the inner surfaces of the bifurcated end portion 224 for preventing movement of the fuse device 221 out of the upper circuit terminal 222 when its fuse link blows.

As shown in Figure 31 of the drawings, a coil tension spring 231 is provided between the arms 224 of the bifurcated end portion of the upper circuit terminal 222, is centered and anchored at its ends on inwardly projecting pins 232 and bears against the inner side of the upper fuse terminal 227. The spring 231 not only limits the inward swinging of the fuse device 221 when its fusible element blows but it also serves to bias the same outwardly for assisting in making the final circuit connection as will be described hereinafter.

Referring again to Figure 26, it will be observed that the lower circuit terminal 223 includes a support member 234 that is bolted to the insulator 100. A contact arm, shown generally at 235, is rotatably mounted relative to the support member 234 on a transverse pin 236 that extends therethrough. In order to bias the contact arm 235 in the direction indicated by the arrow 237 a coil spring 238 is provided around the pin 236. One end of the coil spring 238 is secured to the outer edge of an inner curved housing 239, Figure 32, while the other end is secured to the outer end of a curved outer housing 240 that is carried by the contact arm 235 itself. It will be observed that the curved inner and outer housings 239 and 240 serve with the adjacent depending sides of the support member 234 and contact arm 235 respectively to protect the coil spring 238 from the weather. This construction prevents an accumulation of snow and ice around the spring 238 that might otherwise prevent the rotation of the contact arm 235 and proper circuit interruption as will be readily apparent. The depending sides of the contact arm 235 at its lower end are provided with projections 241 for engaging a transversely extending stop pin 242 in the support member 234.

As shown in Figure 27, the contact arm 235 comprises a pair of spaced side members 243 that are joined at their upper end and form an eye 244 for receiving the prong of a fuse stick. Between the side members 243 and projecting inwardly from the joined outer end thereof is a notched member 245 that is arranged to engage a latch pin 246 that extends transversely through a pair of ears 247 that may be formed integrally with a lower fuse terminal 248 carried by the inner fuse tube of the fuse device 221.

As long as the fuse link of the fuse device 221 remains intact, the relative positions of the various parts will be as illustrated in Figure 26. However, as soon as the fuse link blows, the lower fuse terminal 248 and the inner fuse tube are released for movement downwardly in the direction indicated by the arrow 249. The contact arm 235 rotates in the direction indicated by the arrow 237 under the influence of the spring 238. The notched member 245 remains in contact engagement with the latch pin 246 for a considerable portion of the movement of the contact arm 235 during which time the arc is extinguished in most instances within the inner fuse tube. On final separation of the notched portion 245 from the latch pin 246 no arc is drawn, thereby avoiding pitting or burning of the separable contact members and the likelihood of arcing to adjacent conductors or to ground. In the dropped-out position the lower fuse terminal 248 will be spaced from the lower circuit terminal 223 to provide the desired air gap therebetween.

In Figure 28 of the drawings I have illustrated how the blown fuse device 221 is removed from the upper circuit terminal 222. In this figure it will be observed that a contact arm 235 has rotated to its lowermost position and that the projections 241 are against the stop pin 242. The prong 160 of a fuse stick 161 is inserted in the eye 228 and the trunnions 226 and the fuse device 221 itself are bodily lifted out of the upper circuit terminal 222 in the direction indicated by the arrow 251.

In Figure 29 of the drawings the re-fused fuse device 221 is shown being inserted in the upper circuit terminal 222. The prong 160 of the fuse stick 161 is inserted in the eye 228 and the fuse device 221 is bodily moved in the direction indicated by the arrow 252 to place the trunnions 226 in the upwardly opening hook-shaped end portion 225 of the upper circuit terminal 222.

As shown in Figure 30, the re-fused fuse device 221 swings inwardly as indicated by the arrow 253 until the upper fuse terminal 226 engages the coil spring 231, Figure 31. It will be observed that the spring 231 holds the fuse device 221 slightly to the right of its final position as shown in Figure 26. The prong 160 of the fuse stick 161 is then inserted in the eye 244 of the contact arm 235 and it is rotated thereby in the direction indicated by the arrow 254 until the inclined inner surface 255 thereof engages the transverse latch pin 246 that is carried by the spaced ears of the lower fuse terminal 248. The continued rotation of the contact arm 235 rotates the fuse device 221 inwardly and the latch pin 246 slides down along the inclined surface 255 until it snaps into the notched member 245. The outward biasing action of the spring 231 assists in effecting this latching operation. The fuse stick 161 is then removed and the fuse device 221 is ready for operation.

Figure 33:
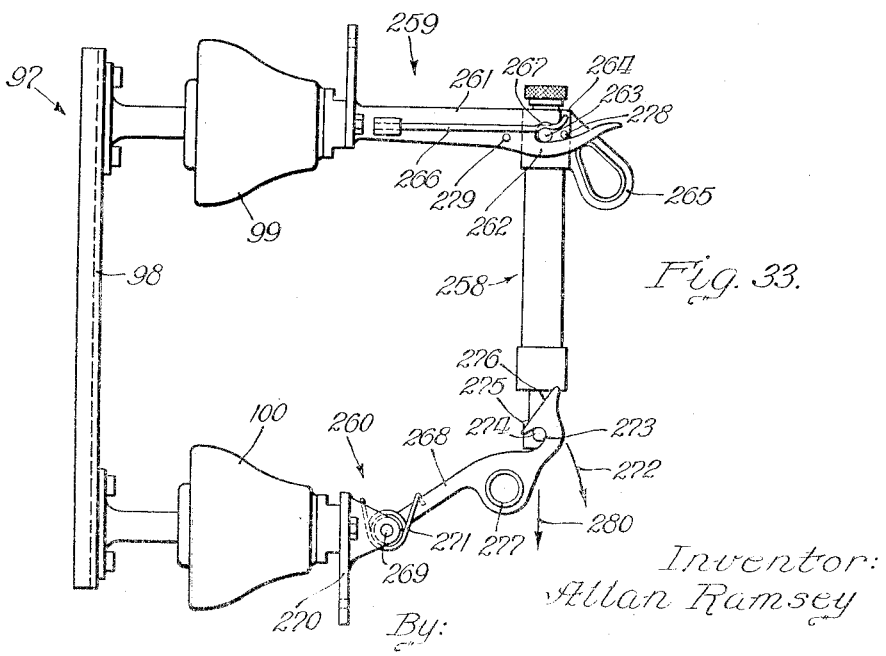
Figure 33 is a view, in side elevation, of another embodiment of the form of mounting device shown in Figure 26.

In Figure 33 of the drawings I have shown a modified form of the circuit interrupting apparatus illustrated in Figure 26. The fuse device, shown generally at 258 in Figure 33, is similar in internal construction to the fuse device 11 shown in Figure 5. It is arranged to be mounted between an upper circuit terminal 259 carried by the insulator 99 and a lower circuit terminal 260 carried by the insulator 100.

The upper circuit terminal 259 comprises an outwardly extending support member 261, the outer bifurcated end portions of which are each provided with an upwardly and outwardly opening hook-shaped portion 262 for receiving therein arms or trunnions 263 of an upper fuse terminal 264 of the outer fuse tube of the fuse device 258. An eye 265 is provided on the upper fuse terminal 264 for receiving the prong of a fuse stick. Spring fingers 266 are positioned on opposite sides of the support member 261 and adjacent their outer ends are provided with downwardly curved portions 267 for engaging the trunnions 263 and holding the same in position. Since the hook-shaped outer end portions 262 of the support member 261 open outwardly and upwardly, it is unnecessary to provide the flange and lug construction, such as shown at 229 and 230 in Figure 26, for preventing the fuse device 258 from moving out of position on the upper circuit terminal 259 when the fuse link therein blows.

The lower circuit terminal 260 includes a contact arm 268 that is rotatably mounted on a pin 269. It will be noted that the pin 269 is mounted on a support member 270 that is carried by the insulator 100. A coil spring 271 reacting between the contact arm 268 and the support member 270 serves to bias the former in the direction indicated by the arrow 272. At its outer end the contact arm 268 is provided with hook-shaped portions 273 for interfitting with and latching to arms or trunnions 274 that extend from opposite sides of a lower fuse terminal 275 carried by the inner fuse tube 258. The outer end of the contact arm 268 is provided with inclined surfaces 276 for engaging the trunnions 274 and guiding the same into the hook-shaped portions 273. An eye 277 is provided in the contact arm 268 for receiving the prong of a fuse stick whereby the contact arm 268 may be rotated into the circuit closed position. In order to bias the fuse device 258 outwardly to assist in latching the contact arm 268 to the trunnions 274, the upper fuse terminal 264 is provided with oppositely extending pins 278 which engage the upper surface of the lower jaws of the hook-shaped portion 262 to permit the spring fingers 266 to swing the fuse device 258 outwardly slightly by acting generally downwardly on the trunnions 263. This action is similar to the action of the tension spring 231, Figures 26 and 31, described hereinbefore. Pins 279, projecting outwardly from opposite sides of the upper circuit terminal 259 limit the downward movement of the spring fingers 266 when the fuse device 258 is removed.

As soon as the fuse link in the fuse device 258 blows, the lower fuse terminal 275 together with the inner fuse tube moves downwardly in the direction indicated by the arrow 280. This movement unlatches the trunnions 274 from the hook-shaped portions 273 and permits the contact arm 268 to rotate in the direction indicated by the arrow 272 under the influence of the coil spring 271. In the dropped-out position, the lower fuse terminal 275 is separated from the lower circuit terminal 260 to provide the desired air gap therebetween. It will be apparent that the contact arm 268 will remain in contact engagement with the lower fuse terminal 275 for a considerable portion of its travel. During this interval the arc will be completely extinguished, in the majority of cases, within the inner fuse tube so that no arc will be formed between the contact arm 268 and the lower circuit terminal 275 when they finally separate to provide an air dielectric therebetween.

In Figure 34 of the drawings, I have illustrated another embodiment of the mounting device for mounting a fuse device shown generally at 281. The details of the internal construction of the fuse device 281 are similar to those of the fuse device 11 illustrated in Figure 5. It will be observed that the construction shown in Figure 34 is different from the embodiments of the invention shown in the previously described figures of the drawings in that the fuse device 281 is mounted in a reversed position.

As shown the fuse device 281 is arranged for mounting between upper and lower circuit terminals 282 and 283. The lower circuit terminal 283 comprises a pair of outwardly extending support members 284 having adjacent their outer ends upwardly opening hook-shaped portions 285 for receiving arms or trunnions 286 of a fuse terminal 287 that closes the end of the outer fuse tube of the fuse device 281 on which it is mounted. An eye 288, formed with the fuse terminal 287, provides for insertion of a prong of a fuse stick for placing the fuse device 281 in position on the lower circuit terminal 283. With a view to preventing disengagement of the fuse device 281 from the lower circuit terminal 283 on operation of the fuse device, the fuse terminal 287 is provided with a flange 289 on opposite sides thereof that is arranged to interfit with a lug 290 that extends inwardly from each side of the support members 284. At its upper end the outer fuse tube of the fuse device 281 is provided with a ferrule 292 that has formed therewith an eye 293 for receiving the prong of a fuse stick to place the fuse device 281 in the circuit closing position.

When the fuse device 281 is moved into the circuit closed position, arms or trunnions 294 extending from opposite sides of a fuse terminal 295 at the open end of the inner fuse tube of the fuse device 281 engage the downwardly opening notched portions 296 of a cover or housing 297. It will be observed that the cover or housing 297 is rotatably mounted on a pin 298 that extends through the outer ends of ears 299 that form a part of the upper circuit terminal 282 which is carried by the insulator 99.

As shown more clearly in Figure 35 of the drawings, the cover or housing 297 is biased to either of two positions by an over-center spring device, shown generally at 300. This device comprises a rod 301 that is pivoted on a pin 302 that extends through a pair of ears 303 formed with the cover or housing 297 along its rear edge. The rod 301 is guided in an aperture 304 formed centrally in a rib 305 that extends between the ears 299. A coil compression spring 306 is interposed between the rib 305 and a flange 307 formed with the rod 301.

In the position shown by the full lines in Figure 35, the over-center spring device 300 serves to bias the cover or housing 297 in such position as to hold the fuse device 281 in the circuit closed position. This is due to the fact that the line through the longitudinal axis of the rod 301 and the pin 302 is above the pin 298 about which the cover or housing 297 rotates.

As soon as the fuse link in the fuse device 281 blows, the inner fuse tube and its open fuse terminal 295 move in the direction indicated by the arrow 308 in Figure 34 or the arrow 309 in Figure 35 The cover or housing 297 is then rotated in the direction indicated by the arrow 310 in Figure 34 or 311 in Figure 35 and the coil spring 306 is slightly compressed, as the rod 301 and pin 302 move into alignment with the pin 298. When these parts are in alignment, they are in the center position. While this movement is taking place, the arc, in most instances, is completely extinguished within the bore of the inner fuse tube. There is then no arc drawn between the trunnions 294 and the cover 297 when they separate with the result that there is little, if any, pitting or burning of the contact surfaces that are separated as a result of the blowing of the fuse link. The cover 297 continues to move and the spring 306 is extended until the cover or housing 297 is moved to the position shown by the broken lines in Figure 35. As soon as the arms or trunnions 294 have cleared the cover or housing 297, the fuse device begins to rock about the trunnions 286 in the lower circuit terminal 283 in the direction indicated by the arrow 312 in Figure 34 or the arrow 313 in Figure 35.

The various parts are protected from the weather. The spring 306 is positioned underneath a flange 314 that extends between the ears 299. The open end of the inner fuse tube of the fuse device 281 is fully protected by the top and depending sides of the cover or housing 297. The fuse terminal 295 is provided with a skirt 316 that extends over the end of the ferrule 292 and prevents the direct entrance of moisture, snow, sleet, etc., into the space between the inner and outer fuse tubes of the fuse device 281.

A flexible shunt 317 is provided between the cover 297 and the flange 314, forming a part of the upper circuit terminal 282 to insure proper electrical connection therebetween.

The cover or housing 297 is provided with an eye 318 for engagement by the prong of a fuse stick for pulling the cover to operative position for receiving the fuse device 281.

Since it is obvious that certain further changes may be made in the above constructions and different embodiments of the invention may be made without departing from the scope thereof, it is intended that all matter contained in the foregoing description or as shown in the accompanying drawings shall be interpreted as illustrative and not in a limiting sense.

I claim as my invention:

1. A device for interconnecting a pair of circuit terminals comprising, in combination, a fuse housing, fuse terminals on said fuse housing, means for connecting one of said fuse terminals to one of said circuit terminals, a contact arm mounted for rotation on the other of said circuit terminals and detachably connected to the other of said fuse terminals, fusible means interconnecting said fuse terminals and maintaining said contact arm in engagement with said other fuse terminal, means biasing said contact arm away from said other fuse terminal, and means for extinguishing the arc drawn on blowing of said fusible means before said contact arm is disconnected from said other fuse terminal.

2. A device for interconnecting a pair of circuit terminals comprising, in combination, a fuse housing, fuse terminals on said fuse housing, means for connecting one of said fuse terminals to one of said circuit terminals, a contact arm mounted for rotation on the other of said circuit terminals, arm means carried by the other of said fuse terminals, said contact arm being so shaped at its outer end as to remain in engagement with said arm means for a predetermined portion of the movement of said contact arm, fusible means interconnecting said fuse terminals and maintaining said contact arm in engagement with said arm means, means biasing said contact arm away from engagement with said arm means, and means for extinguishing the arc drawn on blowing of said fusible means before said contact arm is disconnected from said arm means 3. A device for interconnecting a pair of circuit terminals comprising, in combination, a fuse housing having a bore closed at one end and open at the other, fuse terminals on said fuse housing, means for connecting one of said fuse terminals to one of said circuit terminals, a current arm mounted for rotation on the other of said circuit terminals and detachably connected to the other of said fuse terminals, a fuse link inside of said bore adjacent the open end thereof including a pair of relatively infusible terminals connected by fusible means and interconnecting said fuse terminals and maintaining said contact arm in engagement with said other fuse terminal, and means biasing said contact arm away from said other fuse terminal, the arc formed between said relatively infusible terminals of said fuse link on blowing of said fusible means being extinguished before said contact arm is disconnected from said other fuse terminal.

4. A device for interconnecting a pair of circuit terminals comprising, in combination, a fuse housing, fuse terminals on said fuse housing, means for connecting one of said fuse terminals to one of said circuit terminals, a contact arm mounted for rotation on the other of said circuit terminals, arm means carried by the other of said fuse terminals, said contact arm being so shaped at its outer end as to remain in engagement with said arm means for a predetermined portion of the movement of said contact arm, a fuse link inside of said fuse housing including a pair of relatively infusible terminals connected by fusible means and interconnecting said fuse terminals and maintaining said contact arm in engagement with said arm means, and means biasing said contact arm away from engagement with said arm means, the arc formed between said relatively infusible terminals of said fuse link on blowing of said fusible means being extinguished before said contact arm is disconnected from said arm means.

5. A fuse device comprising, in combination, a first fuse tube, a second fuse tube telescoped with said first fuse tube, spring means biasing said fuse tubes for movement relative to each other, a terminal at one end of said first fuse tube, a terminal at one end of said second fuse tube, and a conductor including a fusible section interconnecting said terminals and restraining said fuse tubes from relative movement as long as the fusible section remains intact.

6. A fuse device comprising, in combination, a first fuse tube, a second fuse tube telescoped with said first fuse tube, means biasing said fuse tubes for movement relative to each other, a first terminal closing one end of said first fuse tube, a second terminal at one end of said second fuse tube but leaving the same substantially open, and a conductor including a fusible section interconnecting said first and second terminals and restraining said fuse tubes from relative movement as long as the fusible section remains intact.

7. A fuse device comprising, in combination, a first fuse tube, a second fuse tube telescoped with said first fuse tube, a coil spring inside one of said fuse tubes acting to bias them for movement relative to each other, a terminal at one end of said first fuse tube, a terminal at one end of said second fuse tube, and a conductor including a fusible section interconnecting said terminals and restraining said fuse tubes from relative movement as long as the fusible section remains intact.

8. A fuse device comprising, in combination, a first fuse tube, a second fuse tube telescoped with said first fuse tube, a coil spring inside one of said fuse tubes acting to bias them for movement relative to each other, a first terminal closing one end of said first fuse tube, a second terminal at one end of said second fuse tube but leaving the same substantially open, and a conductor including a fusible section interconnecting said first and second terminals and restraining said fuse tubes from relative movement as long as the fusible section remains intact.

9. A fuse device comprising, in combination, a first fuse tube, a second fuse tube telescoped with said first fuse tube, a first terminal closing one end of said first fuse tube, a second terminal at one end of said second fuse tube but leaving the same substantially open, a coil compression spring inside said first fuse tube reacting between the closed end of said first fuse tube and the adjacent end of said second fuse tube to bias them for movement relative to each other, and a conductor including a fusible section interconnecting said first and second terminals and restraining said coil compression spring as long as the fusible section remains intact.

10. A fuse device comprising, in combination, a first fuse tube, a second fuse tube telescoped with said first fuse tube, a first terminal closing one end of said first fuse tube, a second terminal at one end of said second fuse tube but leaving the same substantially open, a rod-like terminal secured at one end to said first terminal and extending into the bore of said second fuse tube, a coil spring inside one of said fuse tubes acting to bias them for movement relative to each other, and a fuse link interconnecting the other end of said rod-like terminal and said second terminal.

11. A fuse device comprising, in combination, a first fuse tube, a second fuse tube telescoped with said first fuse tube, a first terminal closing one end of said first fuse tube, a second terminal at one end of said second fuse tube but leaving the same substantially open, a rod-like terminal secured at one end to said first terminal and extending into the bore of said second fuse tube, a coil compression spring inside said first fuse tube reacting between said first terminal and the adjacent end of said second fuse tube to bias them for movement relative to each other, and a fuse link adjacent the open end of said second fuse tube interconnecting the other end of said rod-like terminal and said second terminal.

12. A fuse device comprising, in combination, a first fuse tube, a second fuse tube telescoped with said first fuse tube, a first terminal closing one end of said first fuse tube, a second terminal at one end of said second fuse tube but leaving the same substantially open, a rod-like terminal secured at one end to said first terminal and extending into the bore of said second fuse tube, a coil spring inside one of said fuse tubes acting to bias them for movement relative to each other, a fuse link connected at one end to the other end of said rod-like terminal, a flexible lead at the other end of said fuse link extending out of the open end of said second fuse tube, and means on said second terminal out of the direct path of the products of the arc formed on blowing of said fuse link and flowing out of said open end of said second fuse tube for securing said flexible lead thereto.

13. A fuse device comprising, in combination, a first fuse tube, a second fuse tube telescoped with said first fuse tube, said fuse tubes being biased for movement relative to each other, a rod-like terminal extending from one end of said first fuse tube into the bore of said second fuse tube and substantially filling the same, and fusible means attached to the inner end of said rod-like terminal and acting to restrain said fuse tubes from movement apart, said rod-like terminal being long enough to extend into the inner end of said bore of said second fuse tube when said fuse tubes have reached the limit of said relative movement.

14. A fuse device comprising, in combination, a first fuse tube, a second fuse tube telescoped with said first fuse tube, said fuse tubes being biased apart, a terminal at one end of said first fuse tube, a conductor including a fusible section connected to said terminal and extending through said second fuse tube and acting to restrain said fuse tubes from movement apart, and stop means cooperating with said fuse tube for preventing movement apart beyond a predetermined position.

15. Circuit interrupting means comprising, in combination, upper and lower circuit terminals mounted in insulated spaced relation, a contact arm rotatably mounted on said lower circuit terminal, spring means biasing said contact arm downwardly, a fuse housing mounted on said upper circuit terminal and detachably connected to said contact arm, and fuse link means within said fuse housing arranged and adapted to maintain said fuse housing connected to said contact arm until said fuse link blows, said contact arm rotating downwardly under the influence of said spring means on blowing of said fuse link and away from said fuse housing to provide an air dielectric therebetween.

16. Circuit interrupting means comprising, in combination, upper and lower circuit terminals mounted in insulated spaced relation, a metal support member extending from each of said circuit terminals, the outer end portion of each support member being bifurcated, means biasing said support members apart, and conductor means including a fusible portion interfitting with said bifurcated outer end portions of said support members and restraining the same against movement apart as long as said fusible portion remains intact.

17. A fuse device comprising, in combination an outer fuse tube, means closing one end of said fuse tube, an inner fuse tube slidably mounted in said outer fuse tube and extending out of the other end thereof, said inner fuse tube having a restricted bore open at the outer end, means biasing said fuse tubes apart, and fusible means in said restricted bore adjacent said open end thereof arranged and adapted to prevent movement apart of said fuse tubes.

18. Circuit interrupting means comprising, in combination, upper and lower circuit terminals mounted in insulated spaced relation, a contact arm rotatably mounted on said lower circuit terminal, spring means biasing said contact arm downwardly, a fuse housing rockably mounted at its upper end on said upper circuit terminal and disposed to be latched at its lower end to said contact arm, resilient means interposed between said upper circuit terminal and said fuse housing for biasing the latter outwardly to assist latching to said contact arm, and fusible means within said fuse housing arranged and adapted to maintain said fuse housing latched to said contact arm until said fusible means blows.

19. Circuit interrupting means comprising, in combination, upper and lower circuit terminals mounted in insulated spaced relation, an upper contact arm stationarily mounted on said upper circuit terminal, a lower contact arm mounted for rotation relative to said lower circuit terminal, spring means acting between said lower circuit terminal and said lower contact arm to bias the latter downwardly, a conductor including fuse link means interconnecting said upper and lower contact arms and restraining movement thereof apart, and additional spring means cooperating with said fuse link means and reacting thereon in the same direction as said first mentioned spring means.

20. Circuit interrupting means comprising, in combination, a pair of circuit terminals mounted in insulated spaced relation, a pair of telescoped fuse tubes, fusible means preventing movement apart of said fuse tubes, means for mounting said fuse tubes on said circuit terminals with said fusible means connected therebetween, and means biasing said fuse tubes apart and restrained by said fusible means.

21. Circuit interrupting means comprising, in combination, a pair of circuit terminals mounted in insulated spaced relation, a pair of telescoped fuse tubes, means rockably mounting one of said fuse tubes on one of said circuit terminals, means latching the other of said fuse tubes to the other of said circuit terminals, and fusible means connected between said circuit terminals and preventing movement apart of said fuse tubes, said fuse tubes being biased apart and said latching means being unlatched on blowing of said fusible means and movement apart of said fuse tubes, whereby said other fuse tube is bodily removed from said other circuit terminal to provide an air gap therebetween.

22. Circuit interrupting means comprising, in combination, a pair of circuit terminals mounted in insulated spaced relation, a pair of telescoped fuse tubes, means rockably mounting one of said fuse tubes on one of said circuit terminals, means latching the other of said fuse tubes to the other of said circuit terminals, fusible means connected between said circuit terminals and preventing movement apart of said fuse tubes, said fuse tubes being biased apart and said latching means being unlatched on blowing of said fusible means and movement apart of said fuse tubes, whereby said other fuse tube is bodily removed from said other circuit terminal to provide an air gap therebetween, and means holding said one fuse tube on said one circuit terminal when said fusible means blows.

23. Circuit interrupting means comprising, in combination, a pair of circuit terminals mounted in insulated spaced relation, a pair of telescoped fuse tubes, means rockably mounting one of said fuse tubes on one of said circuit terminals, means latching the other of said fuse tubes to the other of said circuit terminals, fusible means connected between said circuit terminals and preventing movement apart of said fuse tubes, said fuse tubes being biased apart and said latching means being unlatched on blowing of said fusible means and movement apart of said fuse tubes, whereby said other fuse tube is bodily removed from said other circuit terminal to provide an air gap therebetween, and flange means on said one fuse tube interfitting with said one circuit terminal and arranged and adapted to prevent separation thereof except when the former is moved to a predetermined position relative to the latter.

24. Circuit interrupting means comprising, in combination, a pair of biased apart circuit terminals mounted in insulated spaced relation, a pair of telescopically related fuse tubes, means rockably mounting one of said fuse tubes on one of said circuit terminals, means latching the other of said fuse tubes to the other of said circuit terminals whereby said fuse tubes are biased apart by said circuit terminals, and fusible means interconnecting said circuit terminals and preventing movement apart of said fuse tubes, said latching means being unlatched on blowing of said fusible means and movement apart of said fuse tubes, whereby said other fuse tube is bodily removed from said other circuit terminal and an air gap is provided therebetween.

25. Circuit interrupting means comprising, in combination, a first circuit terminal, a second circuit terminal, said circuit terminals being mounted in insulated spaced relation, a first fuse tube, a second fuse tube telescoped with said first fuse tube, a first fuse terminal closing one end of said first fuse tube and mounted on said first circuit terminal, a second fuse terminal at one end of said second fuse tube but leaving the same open, said second fuse terminal being mounted on said second circuit terminal, said fuse tubes being biased apart, and a conductor including a fusible section interconnecting said first and second fuse terminals and restraining said fuse tubes from movement apart as long as the fusible section remains intact.

26. Circuit interrupting means comprising, in combination, a first circuit terminal, a second circuit terminal, said circuit terminals being mounted in insulated spaced relation, a first fuse tube, a second fuse tube telescoped with said first fuse tube, a first fuse terminal closing one end of said first fuse tube and rockably mounted on said first circuit terminal, a second fuse terminal at one end of said second fuse tube but leaving the same open, means latching said second fuse terminal to said second circuit terminal, and fusible means connected between said first and second fuse terminals and preventing movement apart of said fuse tubes, said fuse tubes being biased apart and said latching means being unlatched on blowing of said fusible means and movement apart of said fuse tubes, whereby said second fuse terminal is bodily removed from said second circuit terminal to provide an air gap therebetween.

27. Circuit interrupting means comprising, in combination, a first circuit terminal, a second circuit terminal, said circuit terminals being mounted in insulated spaced relation, a first fuse tube, a second fuse tube telescoped with said first fuse tube, a first fuse terminal closing one end of said first fuse tube, means latching said first fuse terminal to said first circuit terminal, a second fuse terminal at one end of said second fuse tube but leaving the same open, means rockably mounting said second fuse terminal on said second circuit terminal, and fusible means connected between said first and second fuse terminals and preventing movement apart of said fuse tubes, said fuse tubes being biased apart and said latching means being unlatched on blowing of said fusible means and movement apart of said fuse tubes whereby said first fuse terminal is bodily removed from said first circuit terminal to provide an air gap therebetween.

28. Circuit interrupting means comprising, in combination, a pair of circuit terminals mounted in insulated spaced relation, a pair of telescoped fuse tubes, means rockably mounting one of said fuse tubes on one of said circuit terminals, a contact arm mounted for rotation relative to the other circuit terminal, said contact arm being detachably connected to the other of said fuse tubes for holding the same in a predetermined position relative to said circuit terminals, fusible means connected between said circuit terminals and preventing movement apart of said fuse tubes, and means biasing said fuse tubes apart, said contact arm being detached from said other fuse tube on blowing of said fusible means and movement apart of said fuse tubes.

29. Circuit interrupting means comprising, in combination, a pair of circuit terminals mounted in insulated spaced relation, a pair of telescoped fuse tubes, means rockably mounting one of said fuse tubes on one of said circuit terminals, means interlocking said one fuse tube with said one circuit terminal, a contact arm mounted for rotation relative to the other circuit terminal, said contact arm being detachably connected to the other of said fuse tubes for holding the same in a predetermined position relative to said circuit terminals, fusible means connected between said circuit terminals and preventing movement apart of said fuse tubes, and means biasing said fuse tubes apart, said contact arm being detached from said other fuse tube on blowing of said fusible means and movement apart of said fuse tubes.

30. Circuit interrupting means comprising, in combination, a pair of circuit terminals mounted in insulated spaced relation, a pair of telescoped fuse tubes, means rockably mounting one of said fuse tubes on one of said circuit terminals, a contact arm mounted for rotation relative to the other circuit terminal, said contact arm being detachably connected to the other of said fuse tubes for holding the same in a predetermined position relative to said circuit terminals, fusible means connected between said circuit terminals and preventing movement apart of said fuse tubes, and spring means cooperating with said contact arm in such manner as to tend to move said fuse tubes apart, said contact arm being detached from said other fuse tube on blowing of said fusible means and movement apart of said fuse tubes.

31. Circuit interrupting means comprising, in combination, a first circuit terminal, a second circuit terminal, said circuit terminals being mounted in insulated spaced relation, a first fuse tube, a second fuse tube telescoped with said first fuse tube, a first fuse terminal closing one end of said first fuse tube and rockably mounted on said first circuit terminal, a second fuse terminal at one end of said second fuse tube but leaving the same open, fusible means connected between said fuse terminals and preventing movement apart of said fuse tubes, a contact arm mounted for rotation relative to said second circuit terminal, said contact arm being detachably connected to said second fuse terminal and adapted to hold said fuse tubes in a predetermined position relative to said circuit terminals, and means biasing said fuse tubes apart, said contact arm being detached from said second fuse terminal on blowing of said fusible means and movement apart of said fuse tubes to interpose an air gap therebetween.

32. Circuit interrupting means comprising, in combination, a first circuit terminal, a second circuit terminal, said circuit terminals being mounted in insulated spaced relation, a first fuse tube, a second fuse tube telescoped with said first fuse tube, a first fuse terminal closing one end of said first fuse tube and rockably mounted on said first circuit terminal, means interlocking said first fuse terminal with said first circuit terminal, a second fuse terminal at one end of said second fuse tube but leaving the same open, fusible means connected between said fuse terminals and preventing movement apart of said fuse tubes, a contact arm mounted for rotation relative to said second circuit terminal, said contact arm being detachably connected to said second fuse terminal and adapted to hold said fuse tubes in a predetermined position relative to said circuit terminals, and means biasing said fuse tubes apart, said contact arm being detached from said second fuse terminal on blowing of said fusible means and movement apart of said fuse tubes to interpose an air gap therebetween.

33. Circuit interrupting means comprising, in combination, a first circuit terminal, a second circuit terminal, said circuit terminals being mounted in insulated spaced relation, a first fuse tube, a second fuse tube telescoped with said first fuse tube, a first fuse terminal closing one end of said first fuse tube and rockably mounted on said first circuit terminal, flange means on said first fuse terminal interfitting with said first circuit terminal and arranged and adapted to prevent separation thereof except when the former is moved to a predetermined position relative to the latter, a second fuse terminal at one end of said second fuse tube but leaving the same open, fusible means connected between said fuse terminals and preventing movement apart of said fuse tubes, a contact arm mounted for rotation relative to said second circuit terminal, said contact arm being detachably connected to said second fuse terminal and adapted to hold said fuse tubes in a predetermined position relative to said circuit terminals, and means biasing said fuse tubes apart, said contact arm being detached from said second fuse terminal on blowing of said fusible means and movement apart of said fuse tubes to interpose an air gap therebetween.

34. Circuit interrupting means comprising, in combination, a first circuit terminal, a second circuit terminal, said circuit terminals being mounted in insulated spaced relation, a first fuse tube, a second fuse tube telescoped with said first fuse tube, a first fuse terminal closing one end of said first fuse tube and rockably mounted on said first circuit terminal, a second fuse terminal at one end of said second fuse tube but leaving the same open, fusible means connected between said fuse terminals and preventing movement apart of said fuse tubes, a contact arm mounted for rotation relative to said second circuit terminal, said contact arm being detachably connected to said second fuse terminal and adapted to hold said fuse tubes in a predetermined position relative to said circuit terminals, and spring means cooperating with said contact arm in such manner as to tend to move said fuse tubes apart, said contact arm being detached from said second fuse terminal on blowing of said fusible means and movement apart of said fuse tubes to interpose an air gap therebetween.

35. Circuit interrupting means comprising, in combination, a first circuit terminal having a first support means extending therefrom the outer end of which is bifurcated and hook-shaped opening upwardly, a second circuit terminal having a second support means extending therefrom the outer end of which is bifurcated and hook-shaped opening downwardly, a first fuse tube, a second fuse tube telescoped with said first fuse tube, a first fuse terminal closing one end of said first fuse tube and having a pair of oppositely extending arms for mounting in said upwardly opening hook-shaped end of said first support means, a second terminal at one end of said second fuse tube but leaving the same open, said second terminal having a pair of oppositely extending arms for mounting in said downwardly opening hook-shaped end of said second support means, said fuse tubes being biased apart, and a conductor including a fusible section interconnecting said first and second fuse terminals and restraining said fuse tubes from movement apart as long as said fusible section remains intact, said second fuse terminal on blowing of said fusible section moving out of engagement with said second support means and said first fuse terminal rotating in said first support means with said fuse tubes whereby an air gap is formed between said second fuse terminal and said second support means.

36. Circuit interrupting means comprising, in combination, a first circuit terminal having a first support means extending therefrom the outer end of which is bifurcated and hook-shaped opening upwardly, a second circuit terminal having a second support means extending therefrom the outer end of which is bifurcated and hook-shaped opening downwardly, a first fuse tube, a second fuse tube telescoped with said first fuse tube, a first fuse terminal closing one end of said first fuse tube and having a pair of oppositely extending arms for mounting in said upwardly opening hook-shaped end of said first support means, a second terminal at one end of said second fuse tube but leaving the same open, said second terminal having a pair of oppositely extending arms for mounting in said downwardly opening hook-shaped end of said second support means, at least one of said support means being inherently resilient and adapted to bias said fuse tubes apart, and a conductor including a fusible section interconnecting said first and second fuse terminals and restraining said fuse tubes from movement apart as long as said fusible section remains intact, said second fuse terminal on blowing of said fusible section moving out of engagement with said second support means and said first fuse terminal rotating in said first support means with said fuse tubes, whereby an air gap is formed between said second fuse terminal and said second support means.

37. Circuit interrupting means comprising, in combination, a first circuit terminal having a first support means extending therefrom the outer end of which is bifurcated and hook-shaped opening upwardly, a second circuit terminal having a second support means extending therefrom the outer end of which is bifurcated and hook-shaped opening downwardly, a first fuse tube, a second fuse tube telescoped with said first fuse tube, a first fuse terminal closing one end of said first fuse tube and having a pair of oppositely extending arms for mounting in said upwardly opening hook-shaped end of said first support means, flange means on said first fuse terminal interfitting with said first support means and arranged and adapted to prevent separation thereof except when the former is moved to a predetermined position relative to the latter, a second terminal at one end of said second fuse tube but leaving the same open, said second terminal having a pair of oppositely extending arms for mounting in said downwardly opening hook-shaped end of said second support means, said fuse tubes being biased apart, and a conductor including a fusible section interconnecting said first and second fuse terminals and restraining said fuse tubes from movement apart as long as said fusible section remains intact, said second fuse terminal on blowing of said fusible section moving out of engagement with said second support means and said first fuse terminal rotating in said first support means with said fuse tubes, whereby an air gap is formed between said second fuse terminal and said second support means.

38. Circuit interrupting means comprising, in combination, a first circuit terminal having a first support means extending therefrom the outer end of which is bifurcated and hook-shaped opening upwardly, a second circuit terminal having a second support means extending therefrom the outer end of which is bifurcated and hook-shaped opening downwardly, a first fuse tube, a second fuse tube telescoped with said first fuse tube, a first fuse terminal closing one end of said first fuse tube and having a pair of oppositely extending arms for mounting in said upwardly opening hook-shaped end of said first support means, flange means on said first fuse terminal interfitting with said first support means and arranged and adapted to prevent separation thereof except when the former is moved to a predetermined position relative to the latter, an eye forming a part of said first fuse terminal for receiving an arm of a fuse stick and being so shaped as to place said flange means in proper interfitting relation with said first support means when carried by said arm of said fuse stick, a second terminal at one end of said second fuse tube but leaving the same open, said second terminal having a pair of oppositely extending arms for mounting in said downwardly opening hook-shaped end of said second support means, said fuse tubes being biased apart, and a conductor including a fusible section interconnecting said first and second fuse terminals and restraining said fuse tubes from movement apart as long as said fusible section remains intact, said second fuse terminal on blowing of said fusible section moving out of engagement with said second support means and said first fuse terminal rotating in said first support means with said fuse tubes, whereby an air gap is formed between said second fuse terminal and said second support means.

39. Circuit interrupting means comprising, in combination, a first circuit terminal, a second circuit terminal mounted in insulated spaced relation relative to said first circuit terminal, a first fuse tube rockably mounted on said first circuit terminal, a second fuse tube telescoped with said first fuse tube, fusible means connected between said circuit terminals and preventing movement apart of said fuse tubes, latch means at one end of said second fuse tube, a contact arm rotatably mounted on said second circuit terminal, hook means on said contact arm for engaging said latch means, said contact arm having an inclined surface to provide for relative sliding of said hook means into operative engagement with said latch means, and resilient means biasing said contact arm in such direction as to tend to move said fuse tubes apart.

40. Circuit interrupting means comprising, in combination, a first circuit terminal, a second circuit terminal mounted in insulated spaced relation relative to said first circuit terminal, a first fuse tube rockably mounted on said first circuit terminal, a second fuse tube telescoped with said first fuse tube, fusible means connected between said circuit terminals and preventing movement apart of said fuse tubes, means on said first circuit terminal and cooperating with said first fuse tube for limiting the inward swing of said fuse tube, latch means at one end of said second fuse tube, a contact arm rotatably mounted on said second circuit terminal, hook means on said contact arm for engaging said latch means, said contact arm having an inclined surface to provide for relative sliding of said hook means into operative engagement with said latch means, and resilient means biasing said contact arm in such direction as to tend to move said fuse tubes apart.

41. Circuit interrupting means comprising, in combination, a first circuit terminal, a second circuit terminal mounted in insulated spaced relation relative to said first circuit terminal, a first fuse tube rockably mounted on said first circuit terminal, a second fuse tube telescoped with said first fuse tube, fusible means connected between said circuit terminals and preventing movement apart of said fuse tube, an eye on said first fuse tube for receiving a fuse stick to place said fuse tubes on said first circuit terminal, latch means at one end of said second fuse tube, a contact arm rotatably mounted on said second circuit terminal, hook means on said contact arm for engaging said latch means, said contact arm having an inclined surface to provide for relative sliding of said hook means into operative engagement with said latch means, resilient means biasing said contact arm in such direction as to tend to move said fuse tubes apart, and an eye on said contact arm for receiving a fuse stick to move said hook means of contact arm into operative relation with said latch means.

42. Circuit interrupting means comprising, in combination, a first circuit terminal having support means extending therefrom the outer end of which is bifurcated and hook-shaped opening upwardly, a first fuse tube, a second fuse tube telescoped with said first fuse tube, a first fuse terminal closing one end of said first fuse tube and having a pair of oppositely extending arms for mounting in said upwardly opening hook-shaped end of said support means, a second fuse terminal at one end of said second fuse tube but leaving the same open, a transverse latch pin carried by said second terminal, fusible means interconnecting said fuse terminals and restraining movement apart of said fuse tubes, a second circuit terminal mounted in insulated spaced relation relative to said first circuit terminal, a support member carried by said second circuit terminal, a contact arm rotatably mounted on said support member, hook means at the outer end of said contact arm for engaging said latch pin, and spring means acting between said support member and said contact arm to bias the latter in a direction tending to separate said fuse tubes.

43. Circuit interrupting means comprising, in combination, a first circuit terminal having support means extending therefrom the outer end of which is bifurcated and hook-shaped opening upwardly, a first fuse tube, a second fuse tube telescoped with said first fuse tube, a first fuse terminal closing one end of said first fuse tube and having a pair of oppositely extending arms for mounting in said upwardly opening hook-shaped end of said support means, means on said first fuse terminal interfitting with said support means and arranged and adapted to prevent separation thereof except when the former is moved to a predetermined position relative to the latter, a second fuse terminal at one end of second fuse tube but leaving the same open, a transverse latch pin carried by said second terminal, fusible means interconnecting said fuse terminals and restraining movement apart of said fuse tubes, a second circuit terminal mounted in insulated spaced relation relative to said first circuit terminal, a support member carried by said second circuit terminal, a contact arm rotatably mounted on said support member, hook means at the outer end of said contact arm for engaging said latch pin, and spring means acting between said support member and contact arm to bias the latter in a direction tending to separate said fuse tubes.

44. Circuit interrupting means comprising, in combination, a first circuit terminal having support means extending therefrom the outer end of which is bifurcated and hook-shaped opening upwardly, a first fuse tube, a second fuse tube telescoped with said first fuse tube, a first fuse terminal closing one end of said first fuse tube and having a pair of oppositely extending arms for mounting in said upwardly opening hook-shaped end of said support means, a second fuse terminal at one end of said second fuse tube but leaving the same open, a transverse latch pin carried by said second terminal, fusible means interconnecting said fuse terminals and restraining movement apart of said fuse tubes, a second circuit terminal mounted in insulated spaced relation relative to said first circuit terminal, a support member carried by said second circuit terminal, a contact arm rotatably mounted on said support member, hook means at the outer end of said contact arm for engaging said latch pin, spring means acting between said support member and said contact arm to bias the latter in a direction tending to separate said fuse tubes, and housing means opening downwardly and covering said spring means to protect the same from the weather.

45. Circuit interrupting means comprising, in combination, a first circuit terminal having support means extending therefrom the outer end of which is bifurcated and hook-shaped opening upwardly, a first fuse tube, a second fuse tube telescoped with said first fuse tube, a first fuse terminal closing one end of said first fuse tube and having a pair of oppositely extending arms for mounting in said upwardly opening hook-shaped end of said support means, means on said first fuse terminal interfitting with said support means and arranged and adapted to prevent separation thereof except when the former is moved to a predetermined position relative to the latter, a second fuse terminal at one end of said second fuse tube but leaving the same open, a transverse latch pin carried by said second terminal, fusible means interconnecting said fuse terminals and restraining movement apart of said fuse tubes, a second circuit terminal mounted in insulated spaced relation relative to said first circuit terminal, a support member carried by said second circuit terminal, a contact arm rotatably mounted on said support member, hook means at the outer end of said contact arm for engaging said latch pin, spring means acting between said support member and said contact arm to bias the latter in a direction tending to separate said fuse tubes, and housing means opening downwardly and covering said spring means to protect the same from the weather.

46. Circuit interrupting means comprising, in combination, a first circuit terminal having support means extending therefrom the outer end of which is bifurcated and hook-shaped opening upwardly, a first fuse tube, a second fuse tube telescoped with said first fuse tube, a first fuse terminal closing one end of said first fuse tube and having a pair of oppositely extending arms for mounting in said upwardly opening hook-shaped end of said support means, a coil spring extending across said bifurcated end of said support means for limiting the inward swing of said fuse tubes and biasing the same outwardly, a second fuse terminal at one end of said second fuse tube but leaving the same open, a transverse latch pin carried by said second terminal, fusible means interconnecting said fuse terminals and restraining movement apart of said fuse tubes, a second circuit terminal mounted in insulated spaced relation relative to said first circuit terminal, a support member carried by said second circuit terminal, a contact arm rotatably mounted on said support member, hook means at the outer end of said contact arm for engaging said latch pin, and spring means acting between said support member and said contact arm to bias the latter in a direction tending to separate said fuse tubes.

47. Circuit interrupting means comprising, in combination, upper and lower circuit terminals mounted in insulated spaced relation, a stationary contact arm carried by said upper circuit terminal, a movable contact arm rotatably mounted on said lower circuit terminal, spring means acting between said lower circuit terminal and said movable contact arm to bias the latter downwardly, and fusible means interconnecting said stationary and movable contact arms and restraining movement of the latter.

48. Circuit interrupting means comprising, in combination, upper and lower circuit terminals mounted in insulated spaced relation, a first fuse tube, a second fuse tube telescoped with said first fuse tube, a first fuse terminal closing one end of said first fuse tube and rockably mounted on said lower circuit terminal, a second fuse terminal at one end of said second fuse tube but leaving the same open, resilient means biasing said fuse tubes apart, fusible means interconnecting said fuse terminals and preventing movement apart of said fuse tubes, and latching means carried by said upper circuit terminal and cooperating with said second fuse terminal for holding said fuse tubes in a predetermined position relative to said circuit terminals, said second fuse terminal on blowing of said fusible means moving out of engagement with said latching means and said first fuse terminal rocking on said lower circuit terminal, whereby an air gap is provided between said second fuse terminal and said upper circuit terminal.

49. Circuit interrupting means comprising, in combination, upper and lower circuit terminals mounted in insulated spaced relation, a first fuse tube, a second fuse tube telescoped with said first fuse tube, a first fuse terminal closing one end of said first fuse tube and rockably mounted on said lower circuit terminal, a second fuse terminal at one end of said second fuse tube but leaving the same open, resilient means biasing said fuse tubes apart, fusible means interconnecting said fuse terminals and preventing movement apart of said fuse tubes, and latching means carried by said upper circuit terminal and cooperating with said second fuse terminal for holding said fuse tubes in a predetermined position relative to said circuit terminals, and housing means extending over the open end of said second fuse tube for protecting the same from the weather, said second fuse terminal on blowing of said fusible means moving out of engagement with said latching means and said first fuse terminal rocking on said lower circuit terminal, whereby an air gap is provided between said second fuse terminal and said upper circuit terminal.

50. Circuit interrupting means comprising, in combination, upper and lower circuit terminals mounted in insulated spaced relation, a first fuse tube, a second fuse tube telescoped with said first fuse tube, a first fuse terminal closing one end of said first fuse tube and rockably mounted on said lower circuit terminal, means on said first fuse terminal interfitting with said lower circuit terminal and arranged and adapted to prevent separation thereof except when the former is moved to a predetermined position relative to the latter, a second fuse terminal at one end of said second fuse tube but leaving the same open, resilient means biasing said fuse tubes apart, fusible means interconnecting said fuse terminals and preventing movement apart of said fuse tubes, and latching means carried by said upper circuit terminal and cooperating with said second fuse terminal for holding said fuse tubes in a predetermined position relative to said circuit terminals, said second fuse terminal on blowing of said fusible means moving out of engagement with said latching means and said first fuse terminal rocking on said lower circuit terminal, whereby an air gap is provided between said second fuse terminal and said upper circuit terminal.

51. Circuit interrupting means comprising, in combination, upper and lower circuit terminals mounted in insulated spaced relation, a first fuse tube, a second fuse tube telescoped with said first fuse tube, a first fuse terminal closing one end of said first fuse tube and rockably mounted on said lower circuit terminal, a second fuse terminal at one end of said second fuse tube but leaving the same open, resilient means biasing said fuse tubes apart, fusible means interconnecting said fuse terminals and preventing movement apart of said fuse tubes, latch means on said second fuse terminal, a housing rockably mounted on said upper circuit terminal and having means interfitting with said latch means for holding said fuse tubes in a predetermined position relative to said circuit terminals, said housing covering the open end of said second fuse tube for protecting the same from the weather, and spring means biasing said housing into operative position.

52. Circuit interrupting means comprising, in combination, upper and lower circuit terminals mounted in insulated spaced relation, a first fuse tube, a second fuse tube telescoped with said first fuse tube, a first fuse terminal closing one end of said first fuse tube and rockably mounted on said lower circuit terminal, a second fuse terminal at one end of said second fuse tube but leaving the same open, resilient means biasing said fuse tubes apart, fusible means interconnecting said fuse terminals and preventing movement apart of said fuse tubes, a pair of arms extending from opposite sides of said second fuse terminal, a housing rockably mounted on said upper circuit terminals having depending notched sides interfitting with said arms for holding said fuse tubes in a predetermined position relative to said circuit terminals, said housing with its depending sides covering the open end of said second fuse tube for protecting the same from the weather, and over-center spring means operating either to bias said housing into operative position over the open end of said second fuse tube or to inoperative position out of the path of movement of said second fuse tube on blowing of said fusible means.

53. In a circuit interrupter, in combination, tubular insulating housing means, an arcing chamber within said housing means and biased for movement relative thereto, and means for drawing an arc within said chamber adjacent its open end, said chamber being released for movement when the arc is drawn.

54. In a circuit interrupter, in combination, a tubular insulating housing closed at one end and open at the other, an arcing chamber within said housing closed at one end and open at the other and biased for movement away from the closed end of said housing, the closed ends of said housing and chamber being juxtaposed, and means for drawing an arc within said chamber adjacent its open end, said chamber being released for movement when the arc is drawn.

55. In a circuit interrupter, in combination, tubular insulating housing means, a tubular arcing chamber within said housing means biased for movement relative thereto, terminal means extending from one end of said housing means into the bore of said chamber and substantially filling the same, and means for drawing an arc within said bore from the end of said terminal means, said chamber being released for movement relative to said terminal means when the arc is drawn.

56. In a circuit interrupter, in combination, tubular insulating housing means, a tubular arcing chamber within said housing biased for movement relative thereto and substantially closed at one end and open at the other and having its bore formed by material capable of evolving an arc extinguishing medium due to the heat of an arc, and means for drawing an arc within the bore of said chamber adjacent its open end, said chamber being released for movement when the arc is drawn and the movement thereof being controlled substantially only in accordance with the forces biasing it and being substantially unaffected by the pressure resulting from the evolution of the arc extinguishing medium.

57. In a circuit interrupter, in combination, tubular insulating housing means, a tubular arcing chamber within said housing substantially closed at one end and substantially open at the other and having its bore formed by material capable of evolving an arc extinguishing medium due to the heat of an arc, spring means biasing said chamber for movement relative to said housing means, and means for drawing an arc within the bore of said chamber adjacent its open end, said chamber being released for movement when the arc is drawn and the movement thereof being controlled in accordance with the biasing force of said spring means and being substantially unaffected by the pressure resulting from the evolution of the arc extinguishing medium.

58. In a circuit interrupter, in combination, tubular insulating housing means, a pair of line terminals for said housing means, a tubular arcing chamber within said housing means having its bore formed by material capable of evolving an arc extinguishing medium due to the heat of an arc, spring means biasing said chamber for movement relative to said housing means, and conductor means extending through the bore of said chamber and substantially filling the same for preventing said relative movement and for interconnecting said line terminals, said conductor means including a rod-like terminal extending from one line terminal, a relatively infusible terminal connected to the other line terminal, and fusible means interconnecting said infusible and rod-like terminals, said chamber being released for movement on blowing of said fusible means resulting in the formation of an arc between said rod-like and infusible terminals, and the movement thereof being controlled in accordance with the biasing force of said spring means and being substantially unaffected by the pressure resulting from the evolution of the arc extinguishing medium due to the heat of the arc.

59. In a circuit interrupter, in combination, tubular insulating housing means, a pair of line terminals for said housing means, a tubular arcing chamber within said housing means and biased for movement relative thereto, and conductor means extending through the bore of said chamber for preventing said relative movement and for interconnecting said line terminals, said conductor means including a rod-like terminal extending from one line terminal, a relatively infusible terminal spaced from said rod-like terminal, and fusible means interconnecting said rod-like and infusible terminals, said infusible terminal being freely movable out of said arcing chamber on blowing of said fusible means.

60. In a circuit interrupter, in combination, a tubular insulating housing, terminal means closing one end of said housing, a tubular arcing chamber within said housing biased for movement away from its closed end, terminal means carried by said chamber on the end removed from the closed end of said housing, a rod-like terminal member constituting an extension of the terminal means on said housing and extending into the bore of said chamber and substantially filling the same, and means causing an arc to be drawn between the end of said rod-like terminal member within said bore and said terminal means carried by said chamber, said chamber being released for movement relative to said rod-like terminal member when the arc is drawn.

61. In a circuit interrupter, in combination, tubular insulating housing means, a pair of line terminals for said housing means, a tubular arcing chamber within said housing means and biased for movement relative thereto, and conductor means extending through the bore of said chamber for preventing said relative movement and for interconnecting said line terminals, said conductor means including a rod-like terminal extending from one line terminal, a relatively infusible terminal, fusible means interconnecting said infusible and rod-like terminals, and flexible conductor means interconnecting said infusible terminal and the other line terminal.

62. In a circuit interrupter, in combination, tubular insulating housing means, a pair of line terminals for said housing means one closing one end thereof and the other leaving the same substantially open, a tubular arcing chamber within said housing means and biased for movement away from its closed end, and conductor means extending through the bore of said chamber for interconnecting said line terminals, said conductor means including a rod-like terminal extending from the line terminal at the closed end of said housing means, a relatively infusible terminal spaced from said rod-like terminal, fusible means interconnecting said infusible and rod-like terminals, and flexible conductor means interconnecting said infusible terminal and the line terminal at the open end of said housing means.

63. Circuit interrupting apparatus comprising, in combination, upper and lower circuit terminals, means mounting said circuit terminals in insulated spaced relation, a fuse tube, a fuse terminal at the upper end of said fuse tube, a fuse link in said fuse tube connected to said fuse terminal and including conducting means extending out of the lower end of said fuse tube, conductor means interconnecting said upper circuit terminal and said fuse terminal prior to, during and after blowing of said fuse link, disconnecting switch means normally interconnecting said conducting means of said fuse link and said lower circuit terminal, and means biasing said disconnecting switch means to the open position after said fuse link has blown.

64. Circuit interrupting apparatus comprising, in combination, a pair of circuit terminals in insulated spaced relation, a fuse tube having a fuse terminal at one end connected to one of said circuit terminals prior to, during and after circuit interruption, a fuse link in said fuse tube connected at one end to said fuse terminal and having its other end extending out of the other end of said fuse tube, switch means interconnecting said other end of said fuse link and said other circuit terminal, and means restrained by said fuse link for withdrawing said other end thereof from said fuse tube and for effecting operation of said switch means to the open position as a result of blowing of said fuse link.

65. Circuit interrupting means comprising, in combination, a fuse device including fusible means therein adapted to be blown on the occurrence of an overload, and disconnecting switch means connected in series circuit relation with said fuse device and automatically operable to open position as a result of blowing of said fusible means.

66. Means for interrupting an electric circuit comprising, in combination, means responsive to excess current flow in said circuit arranged and adapted to provide one break therein on operation thereof, and disconnecting switch means connected in series circuit relation with said means and automatically operable as a result of operation thereof to provide a second break in said circuit.

67. Means for interrupting an electric circuit comprising, in combination, a fuse device and a disconnecting switch connected in series circuit relation in said circuit, fusible means in said fuse device adapted to be blown on the occurrence of an overload in said circuit thereby providing one break therein, said disconnecting switch being biased to open position and operable as a result of blowing of said fusible means to provide an additional break in said circuit.

68. In a fuse construction, a terminal member, a switch in series with said terminal member and permanently biased towards open position, and a fuse link in series with said switch and restraining said switch against opening movement, said switch being released upon rupture of said fuse link.

69. In a fuse construction, a terminal member, a switch in series with said terminal member and permanently biased toward open position, a latch normally restraining said switch against opening movement, and a fuse link in series with said switch and normally restraining said latch, said latch being released upon rupture of said fuse link, whereby said switch will move to open position.

70. In a fuse construction, a fuse tube, a pair of stationary contacts, a normally closed switch permanently biased towards open position, and a fuse link within said fuse tube normally restraining said switch against opening movement, said switch and fuse link being connected in series circuit relation between said pair of stationary contacts.

71. In a fuse construction, in combination, a pair of line terminals and means for mounting the same in insulated spaced relation, fuse link housing means having a fuse terminal at one end adapted to be connected to one line terminal and open at the other end, a fuse link within said housing means connected to said fuse terminal and having a flexible lead extending out of said open end of said housing means, a second fuse terminal adjacent said open end of said housing means to which said flexible lead is adapted to be connected, normally closed switch means interconnecting said second fuse terminal and the other line terminal, and means operable on blowing of said fuse link for moving said switch means to the open position.

72. In a fuse construction, in combination, a pair of line terminals and means for mounting the same in insulated spaced relation, fuse link housing means having a fuse terminal at one end adapted to be connected to one line terminal and open at the other end, a fuse link within said housing means connected to said fuse terminal and having a flexible lead extending out of said open end of said housing means, a second fuse terminal adjacent said open end of said housing means to which said flexible lead is adapted to be connected, normally closed switch means interconnecting said second fuse terminal and the other line terminal, and means operable on blowing of said fuse link for moving said switch means to the open position, at least a portion of said fuse housing means remaining in place after said fuse link blows.

73. In a fuse construction, in combination, a pair of line terminals and means for mounting the same in insulated spaced relation, fuse link housing means having a fuse terminal at one end adapted to be connected to one line terminal and open at the other end, a fuse link within said housing means connected to said fuse terminal and having a flexible lead extending out of said open end of said housing means, a second fuse terminal adjacent said open end of said housing means to which said flexible lead is adapted to be connected, spring means biasing said second fuse terminal whereby said fuse link is tensioned, normally closed switch means interconnecting said second fuse terminal and the other line terminal, additional spring means adapted to bias said switch means to the open position, and means operatively interconnecting said second fuse terminal and said switch means whereby movement of the latter to the open position is effected on blowing of said fuse link.

74. In a circuit interrupter, in combination, tubular insulating housing means, a tubular arcing chamber within said housing means having its bore formed by material capable of evolving an arc extinguishing medium due to the heat of an arc, terminals adapted to be moved relatively apart and to draw an arc therebetween within said bore, one of said terminals being rod-like in character and substantially filling the greater portion of the length of said bore relative to which the same is movable, and disconnecting means operable as a result of relative movement apart of said terminals for providing an air gap in the circuit in addition to the gap provided therein between said terminals after the arc is extinguished.

75. In a circuit interrupter, in combination, tubular insulating housing means, a tubular arcing chamber within said housing means having its bore formed by material capable of evolving an arc extinguishing medium due to the heat of an arc, terminals adapted to be moved relatively apart and to draw an arc therebetween within said bore, one of said terminals being rod-like in character and substantially filling the greater portion of the length of said bore relative to which the same is movable, fusible means interconnecting said terminals, spring means for effecting relative movement of said rod-like terminal and said bore and causing separation of said terminals on blowing of said fusible means, and means restrained by said fusible means and movable externally of said housing means on blowing of said fusible means and indicating by its changed position that said fusible means has blown.

76. Means for interrupting an electric circuit comprising, in combination, fuse means responsive to excess current flow in said circuit and arranged and adapted to provide one gap therein on blowing thereof for interrupting current flow, and disconnecting switch means connected in series circuit relation with said fuse means and biased to open circuit position and restrained by said fuse means, said switch means moving to the open circuit position on blowing of said fuse means thereby providing two gaps in series in said circuit after the same has been opened.

77. A fuse comprising line terminals laterally directed with respect to gravity and having oppositely located link-receiving notch portions, one terminal being above the other, a fuse link having hooking means for attachment over said link-receiving notch portions, said fuse link including a tensioning element therein.

78. A fuse comprising oppositely located line terminals, said terminals being curved away from one another toward their ends, a fuse link, means substantially at the ends of said link for hooking said fuse link over the terminals, and a tensioning spring in said fuse link.

79. A fuse comprising oppositely located line terminals, said terminals being curved away from one another toward their ends, said ends having open notches directed away from one another, a fuse link, means substantially at the ends of said terminals for hooking said fuse link over the terminals at the notches, and a tensioning spring in said fuse link.

80. Circuit interrupting means comprising, in combination, a pair of line terminals mounted in insulated spaced relation, a dropout fuse device interconnecting said terminals, means latching said dropout fuse device in operative position, a relatively long rod-like terminal relatively slidably mounted in said fuse device, fusible means restraining relative movement of said rod-like terminal, and spring means restrained by said rod-like terminal as long as said fusible means remains intact for extending the arc formed on blowing of said fusible means and unlatching said latching means whereby said dropout fuse device is permitted to move to inoperative position.

81. Circuit interrupting means comprising, in combination, a pair of line terminals mounted in insulated spaced relation, a dropout fuse device interconnecting said terminals, and having a longitudinally extending bore therein, one end of which is open at least during arc extinction and formed by material capable of evolving an arc extinguishing medium due to the heat of an arc, means latching said dropout fuse device in operative position, a relatively long rod-like terminal relatively slidably mounted in said bore and substantially filling the greater portion of its length and closing its other end, fusible means located in said bore adjacent said one end thereof and restraining relative movement of said rod-like terminal and said bore, and spring means in said dropout fuse device restrained by said rod-like terminal as long as said fusible means remains intact for extending in said bore the arc formed on blowing of said fusible means and unlatching said latching means whereby said dropout fuse device is permitted to move to inoperative position.

82. Circuit interrupting means comprising, in combination, a pair of line terminals mounted in insulated spaced relation, a dropout fuse device interconnecting said terminals, means pivotally mounting said dropout fuse device at one end, means latching said dropout fuse device in operative position at its other end, a relatively long rod-like terminal relatively slidably mounted in said fuse device, fusible means restraining relative movement of said rod-like terminal, and spring means restrained by said rod-like terminal as long as said fusible means remains intact for extending the arc formed on blowing of said fusible means and unlatching said latching means whereby said dropout fuse device is permitted to pivot about said one end to inoperative position.

83. Circuit interrupting means comprising, in combination, a pair of line terminals mounted in insulated spaced relation, a dropout fuse device interconnecting said terminals, and having a longitudinally extending bore therein, one end of which is open at least during arc extinction and formed by material capable of evolving an arc extinguishing medium due to the heat of an arc, means pivotally mounting said dropout fuse device at one end, means latching said dropout fuse device in operative position at its other end, a relatively long rod-like terminal relatively slidably mounted in said bore and substantially filling the greater portion of its length and closing its other end, fusible means located in said bore adjacent said one end thereof and restraining relative movement of said rod-like terminal and said bore, and spring means in said dropout fuse device restrained by said rod-like terminal as long as said fusible means remains intact for extending in said bore the arc formed on blowing of said fusible means and unlatching said latching means whereby said dropout fuse device is permitted to pivot about said one end to inoperative position.

84. Circuit interrupting means comprising, in combination, upper and lower line terminals mounted in insulated spaced relation, a dropout fuse device interconnecting said terminals, means pivotally mounting said dropout fuse device at its lower end, means latching said dropout fuse device in operative position at its upper end, a relatively long rod-like terminal relatively slidably mounted in said fuse device, fusible means restraining relative movement of said rod-like terminal, and spring means restrained by said rod-like terminal as long as said fusible means remains intact for extending the arc formed on blowing of said fusible means and unlatching said latching means whereby said dropout fuse device is permitted to pivot about its lower end away from said upper line terminal to inoperative position.

85. Circuit interrupting means comprising, in combination, upper and lower line terminals mounted in insulated spaced relation, a dropout fuse device interconnecting said terminals and having a longitudinally extending bore therein one end of which is open at least during arc extinction and formed by material capable of evolving an arc extinguishing medium due to the heat of an arc, means pivotally mounting said dropout fuse device at its lower end, means latching said dropout fuse device at its upper end in operative position, a relatively long rod-like terminal relatively slidably mounted in said bore and substantially filling the greater portion of its length and closing its other end, fusible means located in said bore adjacent said one end thereof and restraining relative movement of said rod-like terminal and said bore, and spring means in said dropout fuse device restrained by said rod-like terminal as long as said fusible means remains intact for extending in said bore the arc formed on blowing of said fusible means and unlatching said latching means whereby said dropout fuse device is permitted to pivot about its lower end away from said upper line terminal.

ALLAN RAMSEY.

CERTIFICATE OF CORRECTION.

Patent No. 2,247,701.  July 1, 1941.

ALLAN RAMSEY.

It is hereby certified that error appears in the printed specification of the above numbered patent requiring correction as follows: Page 10, second column, line 69, claim 5, for the word "current" read --contact--; and that the said Letters Patent should be read with this correction therein that the same may conform to the record of the case in the Patent Office.

Signed and sealed this 2nd day of September, A. D. 1941.

(Seal).

Henry Van Arsdale,
Acting Commissioner of Patents.